US012424767B2

(12) United States Patent
Li

(10) Patent No.: US 12,424,767 B2
(45) Date of Patent: Sep. 23, 2025

(54) PLANAR SURFACE FEATURES FOR WAVEGUIDE AND ANTENNA

(71) Applicant: Aptiv Technologies AG, Schaffhausen (CH)

(72) Inventor: Mingjian Li, Santa Clara, CA (US)

(73) Assignee: Aptiv Technologies AG, Schaffhausen (CH)

( * ) Notice: Subject to any disclaimer, the term of this patent is extended or adjusted under 35 U.S.C. 154(b) by 127 days.

(21) Appl. No.: 18/176,329

(22) Filed: Feb. 28, 2023

(65) Prior Publication Data

US 2024/0162629 A1 May 16, 2024

Related U.S. Application Data

(60) Provisional application No. 63/383,847, filed on Nov. 15, 2022.

(51) Int. Cl.
*H01Q 9/04* (2006.01)
*H01Q 21/06* (2006.01)

(52) U.S. Cl.
CPC ........... *H01Q 21/065* (2013.01); *H01Q 9/045* (2013.01)

(58) Field of Classification Search
CPC .... H01Q 21/061; H01Q 21/0037; H01Q 1/36; H01Q 1/50; H01Q 1/3233; H01Q 19/22;
(Continued)

(56) References Cited

U.S. PATENT DOCUMENTS

| | | | |
|---|---|---|---|
| 2,840,818 | A | 6/1958 | Reed et al. |
| 3,462,713 | A | 8/1969 | Knerr |

(Continued)

FOREIGN PATENT DOCUMENTS

| | | | |
|---|---|---|---|
| CA | 2654470 | A1 | 12/2007 |
| CN | 1620738 | A | 5/2005 |

(Continued)

OTHER PUBLICATIONS

"Foreign Office Action", CN Application No. 202111321802.9, Jul. 29, 2023, 17 pages.

(Continued)

*Primary Examiner* — Graham P Smith
(74) *Attorney, Agent, or Firm* — Harness, Dickey & Pierce, P.L.C.

(57) ABSTRACT

This document describes techniques and systems for planar surface features for waveguides and antennas. Two structures are arranged with opposing planar surfaces fixed adjacent to a separation plane dividing a channel (e.g., a waveguide, a feed network) to provide an energy path for propagating electromagnetic energy. Part of the channel is formed between side walls of a recessed groove within one opposing surface; another channel part is formed by an arrangement of surface features spaced and shaped on the other opposing surface. At least two surface features are adjacent protrusions contoured to compliment the sidewalls of the recessed groove. An area on each opposing surface between the recessed groove and the adjacent protrusions is configured to form the energy path through the channel including to prevent energy leakage from the separation plane dividing the channel.

19 Claims, 11 Drawing Sheets

(58) Field of Classification Search
CPC .... H01Q 21/005; H01Q 21/064; H01Q 9/045; H01P 1/2005; H01P 3/123
See application file for complete search history.

(56) References Cited

U.S. PATENT DOCUMENTS

| | | | |
|---|---|---|---|
| 3,579,149 | A | 5/1971 | Ramsey |
| 4,157,516 | A | 6/1979 | Grijp |
| 4,453,142 | A | 6/1984 | Murphy |
| 4,562,416 | A | 12/1985 | Sedivec |
| 5,065,123 | A | 11/1991 | Heckaman et al. |
| 5,350,499 | A | 9/1994 | Shibaike et al. |
| 5,414,394 | A | 5/1995 | Gamand et al. |
| 5,637,521 | A | 6/1997 | Rhodes et al. |
| 5,923,225 | A | 7/1999 | Santos |
| 5,929,728 | A | 7/1999 | Barnett et al. |
| 5,982,250 | A | 11/1999 | Hung et al. |
| 5,982,256 | A | 11/1999 | Uchimura et al. |
| 5,986,527 | A | 11/1999 | Ishikawa et al. |
| 6,064,350 | A | 5/2000 | Uchimura et al. |
| 6,072,375 | A | 6/2000 | Adkins et al. |
| 6,127,901 | A | 10/2000 | Lynch |
| 6,414,573 | B1 | 7/2002 | Swineford et al. |
| 6,489,855 | B1 | 12/2002 | Kitamori et al. |
| 6,535,083 | B1 | 3/2003 | Hageman et al. |
| 6,622,370 | B1 | 9/2003 | Sherman et al. |
| 6,658,233 | B1 | 12/2003 | Ikeda |
| 6,788,918 | B2 | 9/2004 | Saitoh et al. |
| 6,794,950 | B2 | 9/2004 | Toit et al. |
| 6,859,114 | B2 | 2/2005 | Eleftheriades et al. |
| 6,867,660 | B2 | 3/2005 | Kitamori et al. |
| 6,958,662 | B1 | 10/2005 | Salmela et al. |
| 6,995,726 | B1 | 2/2006 | West et al. |
| 7,142,165 | B2 | 11/2006 | Sanchez et al. |
| 7,276,988 | B2 | 10/2007 | Stoneham |
| 7,420,442 | B1 | 9/2008 | Forman |
| 7,439,822 | B2 | 10/2008 | Shimura et al. |
| 7,495,532 | B2 | 2/2009 | McKinzie, III |
| 7,626,476 | B2 | 12/2009 | Kim et al. |
| 7,659,799 | B2 | 2/2010 | Jun et al. |
| 7,886,434 | B1 | 2/2011 | Forman |
| 7,973,616 | B2 | 7/2011 | Shijo et al. |
| 7,994,879 | B2 | 8/2011 | Kim et al. |
| 8,013,694 | B2 | 9/2011 | Hiramatsu et al. |
| 8,089,327 | B2 | 1/2012 | Margomenos et al. |
| 8,159,316 | B2 | 4/2012 | Miyazato et al. |
| 8,395,552 | B2 | 3/2013 | Geiler et al. |
| 8,451,175 | B2 | 5/2013 | Gummalla et al. |
| 8,451,189 | B1 | 5/2013 | Fluhler |
| 8,680,936 | B2 | 3/2014 | Purden et al. |
| 8,692,731 | B2 | 4/2014 | Lee et al. |
| 8,717,124 | B2 | 5/2014 | Vanhille et al. |
| 8,803,638 | B2 | 8/2014 | Kildal |
| 8,948,562 | B2 | 2/2015 | Norris et al. |
| 9,007,269 | B2 | 4/2015 | Lee et al. |
| 9,203,155 | B2 | 12/2015 | Choi et al. |
| 9,246,204 | B1 | 1/2016 | Kabakian |
| 9,258,884 | B2 | 2/2016 | Saito |
| 9,356,238 | B2 | 5/2016 | Norris et al. |
| 9,450,281 | B2 | 9/2016 | Kim |
| 9,647,313 | B2 | 5/2017 | Marconi et al. |
| 9,653,773 | B2 | 5/2017 | Ferrari et al. |
| 9,673,532 | B2 | 6/2017 | Cheng et al. |
| 9,806,393 | B2 | 10/2017 | Kildal et al. |
| 9,813,042 | B2 | 11/2017 | Xue et al. |
| 9,843,301 | B1 | 12/2017 | Rodgers et al. |
| 9,935,065 | B1 | 4/2018 | Baheti et al. |
| 9,947,981 | B1 | 4/2018 | Strassner et al. |
| 9,991,606 | B2 | 6/2018 | Kirino et al. |
| 9,997,842 | B2 | 6/2018 | Kirino et al. |
| 10,027,032 | B2 | 7/2018 | Kirino et al. |
| 10,042,045 | B2 | 8/2018 | Kirino et al. |
| 10,090,600 | B2 | 10/2018 | Kirino et al. |
| 10,114,067 | B2 | 10/2018 | Lam et al. |
| 10,153,533 | B2 | 12/2018 | Kirino |
| 10,158,158 | B2 | 12/2018 | Kirino et al. |
| 10,164,318 | B2 | 12/2018 | Seok et al. |
| 10,164,344 | B2 | 12/2018 | Kirino et al. |
| 10,218,078 | B2 | 2/2019 | Kirino et al. |
| 10,230,173 | B2 | 3/2019 | Kirino et al. |
| 10,263,310 | B2 | 4/2019 | Kildal et al. |
| 10,312,596 | B2 | 6/2019 | Gregoire |
| 10,320,083 | B2 | 6/2019 | Kirino et al. |
| 10,333,227 | B2 | 6/2019 | Kirino et al. |
| 10,374,323 | B2 | 8/2019 | Kamo et al. |
| 10,381,317 | B2 | 8/2019 | Maaskant et al. |
| 10,381,741 | B2 | 8/2019 | Kirino et al. |
| 10,439,298 | B2 | 10/2019 | Kirino et al. |
| 10,468,736 | B2 | 11/2019 | Mangaiahgari |
| 10,505,282 | B2 | 12/2019 | Lilja |
| 10,534,061 | B2 | 1/2020 | Vassilev et al. |
| 10,559,889 | B2 | 2/2020 | Kirino et al. |
| 10,594,045 | B2 | 3/2020 | Kirino et al. |
| 10,601,144 | B2 | 3/2020 | Kamo et al. |
| 10,608,345 | B2 | 3/2020 | Kirino et al. |
| 10,622,696 | B2 | 4/2020 | Kamo et al. |
| 10,627,502 | B2 | 4/2020 | Kirino et al. |
| 10,651,138 | B2 | 5/2020 | Kirino et al. |
| 10,651,567 | B2 | 5/2020 | Kamo et al. |
| 10,658,760 | B2 | 5/2020 | Kamo et al. |
| 10,670,810 | B2 | 6/2020 | Sakr et al. |
| 10,705,294 | B2 | 7/2020 | Guerber et al. |
| 10,707,584 | B2 | 7/2020 | Kirino et al. |
| 10,714,802 | B2 | 7/2020 | Kirino et al. |
| 10,727,561 | B2 | 7/2020 | Kirino et al. |
| 10,727,611 | B2 | 7/2020 | Kirino et al. |
| 10,763,590 | B2 | 9/2020 | Kirino et al. |
| 10,763,591 | B2 | 9/2020 | Kirino et al. |
| 10,775,573 | B1 | 9/2020 | Hsu et al. |
| 10,811,373 | B2 | 10/2020 | Zaman et al. |
| 10,826,147 | B2 | 11/2020 | Sikina et al. |
| 10,833,382 | B2 | 11/2020 | Sysouphat |
| 10,833,385 | B2 | 11/2020 | Mangaiahgari |
| 10,892,536 | B2 | 1/2021 | Fan et al. |
| 10,957,971 | B2 | 3/2021 | Doyle et al. |
| 10,957,988 | B2 | 3/2021 | Kirino et al. |
| 10,971,824 | B2 | 4/2021 | Baumgartner et al. |
| 10,983,194 | B1 | 4/2021 | Patel et al. |
| 10,985,434 | B2 | 4/2021 | Wagner et al. |
| 10,992,056 | B2 * | 4/2021 | Kamo .................... H01Q 13/22 |
| 11,061,110 | B2 | 7/2021 | Kamo et al. |
| 11,088,432 | B2 | 8/2021 | Seok et al. |
| 11,088,464 | B2 | 8/2021 | Sato et al. |
| 11,114,733 | B2 | 9/2021 | Doyle et al. |
| 11,121,475 | B2 | 9/2021 | Yang et al. |
| 11,169,325 | B2 | 11/2021 | Guerber et al. |
| 11,171,399 | B2 | 11/2021 | Alexanian et al. |
| 11,196,171 | B2 | 12/2021 | Doyle et al. |
| 11,201,414 | B2 | 12/2021 | Doyle et al. |
| 11,249,011 | B2 | 2/2022 | Challener |
| 11,283,162 | B2 | 3/2022 | Doyle et al. |
| 11,289,787 | B2 | 3/2022 | Yang |
| 11,349,183 | B2 | 5/2022 | Rahiminejad et al. |
| 11,349,220 | B2 | 5/2022 | Alexanian et al. |
| 11,378,683 | B2 | 7/2022 | Alexanian et al. |
| 11,411,292 | B2 | 8/2022 | Kirino |
| 11,495,871 | B2 | 11/2022 | Vosoogh et al. |
| 11,563,259 | B2 | 1/2023 | Alexanian et al. |
| 11,611,138 | B2 | 3/2023 | Ogawa et al. |
| 11,616,306 | B2 | 3/2023 | Brandenburg et al. |
| 11,626,652 | B2 | 4/2023 | Vilenskiy et al. |
| 11,749,883 | B2 | 9/2023 | Li |
| 11,837,787 | B2 | 12/2023 | Bencivenni |
| 2002/0021197 | A1 | 2/2002 | Elco |
| 2004/0069984 | A1 | 4/2004 | Estes et al. |
| 2006/0113598 | A1 | 6/2006 | Chen et al. |
| 2006/0145777 | A1 | 7/2006 | Mueller |
| 2008/0129409 | A1 | 6/2008 | Nagaishi et al. |
| 2008/0150821 | A1 | 6/2008 | Koch et al. |
| 2009/0040132 | A1 | 2/2009 | Sridhar et al. |
| 2009/0207090 | A1 | 8/2009 | Pettus et al. |
| 2009/0243762 | A1 | 10/2009 | Chen et al. |
| 2010/0193935 | A1 | 8/2010 | Lachner et al. |
| 2011/0140810 | A1 | 6/2011 | Leiba et al. |

(56) References Cited

U.S. PATENT DOCUMENTS

| | | | |
|---|---|---|---|
| 2011/0140979 | A1 | 6/2011 | Dayan et al. |
| 2012/0013421 | A1 | 1/2012 | Hayata |
| 2012/0050125 | A1 | 3/2012 | Leiba et al. |
| 2012/0068316 | A1 | 3/2012 | Ligander |
| 2012/0163811 | A1 | 6/2012 | Doany et al. |
| 2012/0242421 | A1 | 9/2012 | Robin et al. |
| 2012/0256707 | A1 | 10/2012 | Leiba et al. |
| 2012/0256796 | A1 | 10/2012 | Leiba |
| 2013/0057358 | A1 | 3/2013 | Anthony et al. |
| 2013/0256849 | A1 | 10/2013 | Danny et al. |
| 2014/0015709 | A1 | 1/2014 | Shijo et al. |
| 2014/0048310 | A1 | 2/2014 | Montevirgen et al. |
| 2014/0091884 | A1 | 4/2014 | Flatters |
| 2014/0106684 | A1 | 4/2014 | Burns et al. |
| 2015/0097633 | A1 | 4/2015 | Devries et al. |
| 2015/0229017 | A1 | 8/2015 | Suzuki et al. |
| 2015/0295297 | A1 | 10/2015 | Cook et al. |
| 2015/0357698 | A1 | 12/2015 | Kushta |
| 2015/0364804 | A1 | 12/2015 | Tong et al. |
| 2015/0364830 | A1 | 12/2015 | Tong et al. |
| 2016/0043455 | A1 | 2/2016 | Seler et al. |
| 2016/0049714 | A1 | 2/2016 | Ligander et al. |
| 2016/0056541 | A1 | 2/2016 | Tageman et al. |
| 2016/0111764 | A1 | 4/2016 | Kim |
| 2016/0118705 | A1 | 4/2016 | Tang et al. |
| 2016/0204495 | A1 | 7/2016 | Takeda et al. |
| 2016/0276727 | A1 | 9/2016 | Dang et al. |
| 2016/0293557 | A1 | 10/2016 | Topak et al. |
| 2016/0301125 | A1 | 10/2016 | Kim et al. |
| 2017/0084554 | A1 | 3/2017 | Dogiamis et al. |
| 2017/0099705 | A1 | 4/2017 | Mazzon |
| 2017/0324135 | A1 | 11/2017 | Blech et al. |
| 2018/0131084 | A1 | 5/2018 | Park et al. |
| 2018/0226709 | A1 | 8/2018 | Mangaiahgari |
| 2018/0226727 | A1 | 8/2018 | Sato |
| 2018/0233465 | A1 | 8/2018 | Spella et al. |
| 2018/0284186 | A1 | 10/2018 | Chadha et al. |
| 2018/0301816 | A1 | 10/2018 | Kamo et al. |
| 2018/0343711 | A1 | 11/2018 | Wixforth et al. |
| 2018/0351261 | A1 | 12/2018 | Kamo et al. |
| 2018/0375185 | A1 | 12/2018 | Kirino et al. |
| 2019/0006743 | A1 | 1/2019 | Kirino et al. |
| 2019/0013563 | A1 | 1/2019 | Takeda et al. |
| 2019/0194452 | A1 | 6/2019 | Schrauwen |
| 2019/0207286 | A1 | 7/2019 | Moallem |
| 2019/0305415 | A1 | 10/2019 | Sharawi et al. |
| 2020/0021001 | A1 | 1/2020 | Mangaiahgari |
| 2020/0076395 | A1 | 3/2020 | Kamo et al. |
| 2020/0153108 | A1 | 5/2020 | Uemichi |
| 2020/0212594 | A1* | 7/2020 | Kirino .................. H01Q 21/064 |
| 2020/0220273 | A1 | 7/2020 | Ahmadloo |
| 2020/0235453 | A1 | 7/2020 | Lang |
| 2020/0287293 | A1 | 9/2020 | Shi et al. |
| 2020/0343612 | A1 | 10/2020 | Shi |
| 2020/0412012 | A1 | 12/2020 | Zhao et al. |
| 2021/0028549 | A1 | 1/2021 | Doyle et al. |
| 2021/0036393 | A1 | 2/2021 | Mangaiahgari |
| 2021/0159577 | A1 | 5/2021 | Carlred et al. |
| 2021/0305667 | A1 | 9/2021 | Bencivenni |
| 2021/0367352 | A1 | 11/2021 | Izadian et al. |
| 2022/0094071 | A1 | 3/2022 | Doyle et al. |
| 2022/0109246 | A1 | 4/2022 | Emanuelsson et al. |

FOREIGN PATENT DOCUMENTS

| | | | |
|---|---|---|---|
| CN | 1682404 | A | 10/2005 |
| CN | 2796131 | | 7/2006 |
| CN | 201383535 | | 1/2010 |
| CN | 102696145 | A | 9/2012 |
| CN | 103515682 | A | 1/2014 |
| CN | 104900956 | A | 9/2015 |
| CN | 105098295 | A | 11/2015 |
| CN | 105609909 | A | 5/2016 |
| CN | 105680133 | A | 6/2016 |
| CN | 105958167 | A | 9/2016 |
| CN | 106711616 | A | 5/2017 |
| CN | 106785424 | A | 5/2017 |
| CN | 109716861 | A | 5/2019 |
| CN | 109750201 | A | 5/2019 |
| CN | 209389219 | U | 9/2019 |
| DE | 4241635 | A1 | 6/1994 |
| DE | 102016213202 | A1 | 1/2018 |
| DE | 102019200893 | A1 | 7/2020 |
| EP | 2500978 | A1 | 9/2012 |
| EP | 2843758 | A1 | 3/2015 |
| EP | 2945222 | A1 | 11/2015 |
| EP | 3460903 | A1 | 3/2019 |
| GB | 2489950 | A | 10/2012 |
| JP | 2000357916 | A | 12/2000 |
| JP | 2003243902 | A | 8/2003 |
| JP | 2003289201 | A | 10/2003 |
| JP | 3923360 | B2 | 5/2007 |
| KR | 20030031585 | A | 4/2003 |
| KR | 20080044752 | A | 5/2008 |
| KR | 1020080044752 | A | 5/2008 |
| WO | 2013189513 | A1 | 12/2013 |
| WO | 2018003932 | A1 | 1/2018 |
| WO | 2018095541 | A1 | 5/2018 |
| WO | 2019085368 | A1 | 5/2019 |
| WO | 2021122725 | A1 | 6/2021 |

OTHER PUBLICATIONS

"Foreign Office Action", CN Application No. 202210282861.8, Jun. 1, 2023, 13 pages.

"Foreign Office Action", EP Application No. 21203201.5, Jun. 15, 2023, 11 pages.

"Extended European Search Report", EP Application No. 23167063.9, Sep. 11, 2023, 12 pages.

"Extended European Search Report", EP Application No. 23167836.8, Sep. 11, 2023, 10 pages.

Ferrando-Rocher Miguel et al: "A Half-Mode Groove Gap Waveguide for Single-Layer Antennas in the Millimeter-Wave Band", IEEE Antennas and Wireless Propagation Letters, IEEE, Piscataway, NJ, US, vol. 21, No. 12, Jul. 27, 2022, pp. 2402-2406, XP011928651, ISSN: 1536-1225, DOI: 10.1109/LAWP.2022.3194665.

"Extended European Search Report", EP Application No. 22159217.3, Aug. 19, 2022, 11 pages.

"Extended European Search Report", EP Application No. 22170487.7, Sep. 8, 2022, 11 pages.

"Extended European Search Report", EP Application No. 22188348.1, Mar. 14, 2023, 8 pages.

"Foreign Office Action", CN Application No. 201810122408.4, Jan. 26, 2022, 15 pages.

"Foreign Office Action", CN Application No. 201810122408.4, Jan. 30, 2023, 21 pages.

"Foreign Office Action", CN Application No. 201810122408.4, May 6, 2022, 15 pages.

"Foreign Office Action", CN Application No. 201810122408.4, Sep. 20, 2022, 19 pages.

"Foreign Office Action", CN Application No. 202111321802.9, Mar. 31, 2023, 16 pages.

Bauer, et al., "A wideband transition from substrate integrated waveguide to differential microstrip lines in multilayer substrates", Sep. 2010, pp. 811-813.

Dai, et al., "An Integrated Millimeter-Wave Broadband Microstrip-to-Waveguide Vertical Transition Suitable for Multilayer Planar Circuits", IEEE Microwave and Wireless Components Letters, vol. 26, No. 11, 2016, pp. 897-899.

Deslandes, et al., "Integrated Transition of Coplanar to Rectangular Waveguides", 2001 IEEE MTT-S International Microwave Sympsoium Digest, pp. 619-622.

Deutschmann, et al., "A Full W-Band Waveguide-to-Differential Microstrip Transition", Jun. 2019, pp. 335-338.

Ghahramani, et al., "Reducing Mutual Coupling of SIW Slot Array Antenna Using Uniplanar Compact EBG (UC-EBG) Structure", The 8th European Conference on Antennas and Propagation (EuCAP 2014), Apr. 6, 2014, pp. 2002-2004.

(56) References Cited

OTHER PUBLICATIONS

Giese, et al., "Compact Wideband Single-ended and Differential Microstrip-to-waveguide Transitions at W-band", Jul. 2015, 4 pages.
Henawy, et al., "Integrated Antennas in eWLB Packages for 77 GHZ and 79 GHZ Automotive Radar Sensors", 2011 41st European Microwave Conference, Oct. 10, 2011, pp. 1312-1315.
Schellenberg, et al., "CAD Models for Suspended and Inverted Microstrip", IEEE Transactions on Microwave Theory and Techniques, vol. 43, No. 6, Jun. 1995, pp. 1247-1252.
Tong, et al., "A Wide Band Transition from Waveguide to Differential Microstrip Lines", Dec. 2008, 5 pages.
Yuasa, et al., "A millimeter wave wideband differential line to waveguide transition using short ended slot line", Oct. 2014, pp. 1004-1007.
"Extended European Search Report", EP Application No. 18153137.7, Jun. 15, 2018, 8 pages.
"Extended European Search Report", EP Application No. 20166797, Sep. 16, 2020, 11 pages.
"Extended European Search Report", EP Application No. 21203201.5, Apr. 7, 2022, 12 pages.
"Foreign Office Action", CN Application No. 201810122408.4, Jun. 2, 2021, 15 pages.
"Foreign Office Action", CN Application No. 201810122408.4, Oct. 18, 2021, 19 pages.
"Foreign Office Action", CN Application No. 202111321802.9, Nov. 22, 2022, 17 pages.
Jankovic, et al., "Stepped Bend Substrate Integrated Waveguide to Rectangular Waveguide Transitions", Jun. 2016, 2 pages.
Rajo-Iglesias, et al., "Gap Waveguide Technology for Millimeter-Wave Antenna Systems", IEEE Communications Magazine, vol. 56, No. 7, Jul. 2018, pp. 14-20.
Tong, et al., "A Vertical Transition Between Rectangular Waveguide and Coupled Microstrip Lines", IEEE Microwave and Wireless Components Letters, vol. 22, No. 5, May 2012, pp. 251-253.
Topak, et al., "Compact Topside Millimeter-Wave Waveguide-to-Microstrip Transitions", IEEE Microwave and Wireless Components Letters, vol. 23, No. 12, Dec. 2013, pp. 641-643.
Wang, et al., "Mechanical and Dielectric Strength of Laminated Epoxy Dielectric Graded Materials", Mar. 2020, 15 pages.
M. Akbari, A. Farahbakhsh and A.-R. Sebak, "Ridge Gap Waveguide Multilevel Sequential Feeding Network for High-Gain Circularly Polarized Array Antenna," in IEEE transactions on Antennas and Propagation, vol. 67, No. 1., pp. 251-259, Jan. 2019, doi:10.1109/TAP.2018.2878281. (year: 2019).

* cited by examiner

PLANAR SURFACE FEATURES FOR WAVEGUIDE AND ANTENNA

CROSS-REFERENCE TO RELATED APPLICATION

This application claims the benefit under 35 U.S.C. 119(e) of U.S. Provisional Application No. 63/383,847, filed Nov. 15, 2022, the entire disclosure of which is incorporated by reference herein.

BACKGROUND

Some devices (e.g., radar systems) use electromagnetic signals transmitted or received with antennas to detect and track objects. An example of an automotive radar can include a multiple-input, multiple-output (MIMO) radar system, which relies on an antenna array having multiple antenna elements arranged on a vehicle. An antenna is characterized by gain or beamwidth, which represents gain as a function of direction (e.g., a narrow beamwidth, an asymmetrical beamwidth). Achieving a consistent radiation pattern and a desired beamwidth can improve radar performance (e.g., sensitivity, angular resolution). MIMO radar systems often include several antenna elements arranged on or embedded within a planar surface on part of a vehicle, such as, a panel, a plate, or a ground structure. These planar surfaces are usually shared by many antenna elements, as well as other components like processors or monolithic microwave integrated circuits (MMICs). Unfortunately, the exposed flat regions between these surface components can distort the beamwidth (e.g., make it wider than desired) or facilitate cross-interference among the antenna elements and other components. Deviations in a radiation pattern, can cause inaccurate or incomplete radar data to be generated, which if used for vehicle functions and/or control, can lead to unsafe or uncomfortable driving.

SUMMARY

This document describes techniques and systems for planar surface features for waveguides and antennas. As used throughout this disclosure, planar surface features is a phrase that refers to any grooves, notch, cut out, extrusion, cavities, ridges, or any other formation that contours a flat portion of the planar surface to have a non-flat or non-planar shape relative the flat portions that exist between them. The planar surface features are separated by these flat intermediate regions. For ease of explanation, the planar surface features describe primarily include grooves and protrusions, however, ridges, cavities, slots, and other formations that cause a deformation in a contour of the planar surface can be used in. These grooves, protrusions, and other surface features can have various shapes and sizes to achieve different waveguide or antenna characteristics. Protrusions can include convex shapes formed on an otherwise planar or mostly flat surface.

In one example, separate structures are arranged with opposing planar surfaces fixed adjacent to a separation plane dividing a channel (e.g., a waveguide, a feed network) to provide an energy path for propagating electromagnetic energy. Part of the channel is formed between side walls of a recessed groove within one opposing surface; another channel part is formed by an arrangement of surface features spaced and shaped on the other opposing surface. At least two surface features are adjacent protrusions contoured to compliment the sidewalls of the recessed groove. An area on each opposing surface between the recessed groove and the adjacent protrusions is configured to form the energy path through the channel including to prevent energy leakage from the separation plane dividing the channel.

In another example, a structure (e.g., formed from a single piece or multiple pieces) has at least one planar surface. The structure is configured to provide a feed network for propagating electromagnetic energy along an energy path formed under a planar surface. The planar surface includes a recessed cavity with walls surrounding a cavity floor embedded within the planar surface. The cavity floor is shaped to form radiating slot(s) open through the structure to the energy path under the planar surface. A ridge feature protrudes from the planar surface on either side of the recessed cavity with a ridge length that is parallel with the cavity walls and a ridge height set to prevent cross-interference near the radiating slot within the cavity floor, thereby narrowing coverage for the electromagnetic energy within the feed network.

The techniques and systems described also provide methods related to the above-summarized systems including steps executed as part of computer-implemented processes, as well as means for performing the steps.

This Summary introduces simplified concepts related to planar surface structures for waveguides and antennas and is further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of planar surface features for waveguides and antennas are described in this document with reference to the following figures. The same numbers are often used throughout the drawings to reference like features and components:

FIGS. 2-1 and 2-2 illustrate views of an example of a waveguide provided by planar surface features;

FIGS. 3-1 through 3-6 illustrate views of an example antenna system provided by planar surface features;

FIGS. 4-1 through 4-6 illustrate views of another example antenna system provided by planar surface features;

FIG. 5 illustrates an isometric view of example planar surface features for achieving antenna coverage;

FIG. 6 illustrates an example radiation pattern obtained using planar surface features for waveguides and antennas.

DETAILED DESCRIPTION

Overview

Figure 1:
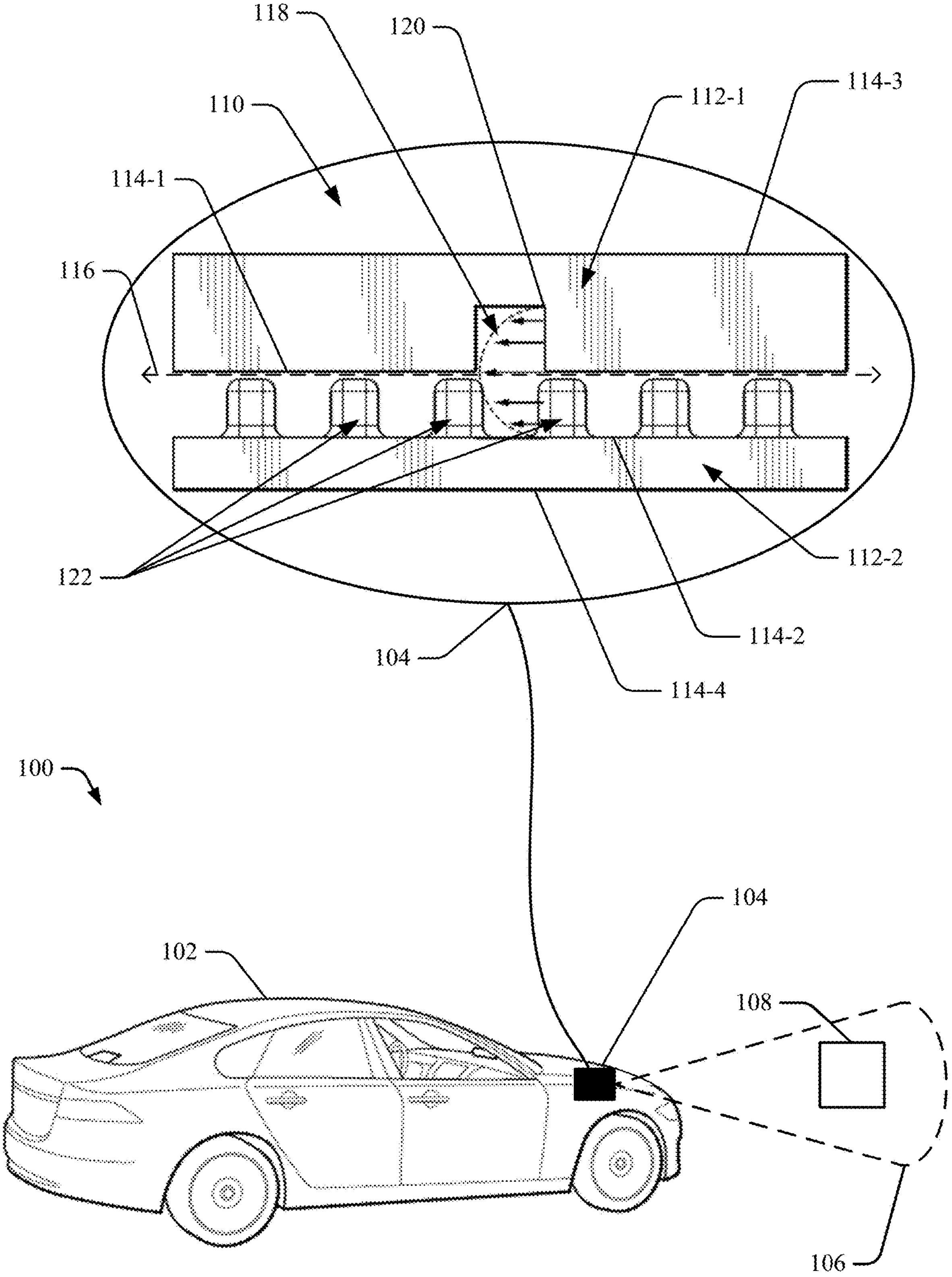
FIG. 1 illustrates an example environment for a vehicle radar system, which uses planar surface features for waveguides and antennas.

Radar systems are a sensing technology that some automotive systems use to acquire information about the surrounding environment. Radar systems generally use an antenna to direct electromagnetic energy or signals being transmitted or received. Such radar systems can use multiple antenna elements in an array or multiple arrays to provide increased gain and directivity than the radiation pattern achievable with a single antenna element. Signals from the multiple antenna elements are combined with appropriate phases and weighted amplitudes to provide the desired radiation pattern.

A structure (e.g., a ground structure) formed of one or more plates may be used to support antenna elements configured to transfer electromagnetic energy to and from the antenna elements formed on or within the plates. An array of antenna elements is often included in or on a single surface of a ground structure, which is approximately flat or mostly planar. Manufacturers may select the number and arrangement of the antenna elements to provide the desired phasing, combining, or splitting of electromagnetic energy. Antenna elements may be equally spaced on the surface of the planar structure to achieve a wide radiation pattern. However, areas of the planar surface, which separate different antenna arrays or antenna elements, can introduce unwanted variability in radiation patterns of the different arrays or elements. For example, non-uniform radiation patterns occur from cross-interference that is facilitated by surface areas in, around, or near positions on the surface where the antenna arrays and elements are supported. Achieving a consistent radiation pattern and a desired beamwidth can improve radar performance (e.g., sensitivity, angular resolution). Unsafe or uncomfortable driving may occur when a vehicle controller relies on inaccurate or incomplete radar data caused when variations are introduced in antenna radiation patterns.

The electromagnetic energy may pass to and from the antenna elements on energy paths provided through channels that are formed beneath the one or more plate surfaces supporting the elements. The channels may be square, elliptical, or circular, however, for ease of manufacturing, a typical channel is rectangular. A narrow side of the channel is called the "b" dimension; a larger, broad side of the channel is called the "a dimension" and is set to be greater than one half a desired wavelength (>0.5λ) of electromagnetic energy desired for the path within the channel. Although described as being hollow, these channels can be filled with other dielectric materials, including solids, liquids, or other gases other than air. Solid dielectric materials may be used to fill the channel to still enable the energy path but prevent moisture or debris from entering these cavities to improve performance over using cavities filled with air. However, air may be sufficient when inputs or outputs of a hollow channel are otherwise sufficiently protected from the environment.

These energy paths are configured as waveguides or feed networks for the electromagnetic energy output or received by the system. The energy paths are contained inside hollow or dielectric-filled channels formed in or between the plates. For example, some existing waveguides and antennas are formed from a single structure that includes closed structures formed within that are channels configured as waveguide or feed network for containing an electromagnetic energy path through the structure. Because these are closed structures, there is no energy leakage from the channel and therefore high precision in signal propagation. However, complex machining or fabrication techniques, such as Computer Numerical Controlled (CNC) machining or three-dimensional printing, may be needed to form these structures, which is not preferable for mass production due to its high cost. In addition, some two-piece waveguides or feed networks can be created between parallel plates. Each plate provides part of the two-piece waveguide or antenna. Each plate may have a groove formed in a surface, which represents one of two parts of a channel for a waveguide or antenna. The plates are arranged to align the grooves formed in the two surfaces in parallel. The plates are then bonded or fixed together to form a channel between the adjacent surfaces. The channel is formed within the cavities produced between the aligned grooves of the two plates. Two-piece structures may enable less expensive manufacturing techniques to be used, which can reduce fabrication costs relative to their counterpart one-piece waveguide or antenna structure. For example, two-piece structures can be formed between printed circuit board (PCB) layers, from parts products through metal stamping or casting, or components made from injection molding (e.g., magnesium, plastic). While each piece may be formed with little complexity, the particular bonding process and bonding materials used can greatly affect cost and complexity when production output is increased to support mass production of parts, for instance, to support demand from the automotive industry. Performance can suffer from using bonding materials, which despite providing a strong joint, may increase electromagnetic energy leakage (e.g., loss in the radio frequency signal transmission) from the waveguide or antenna.

In contrast, this document describes planar surface features for waveguides and antennas. As used throughout this disclosure, planar surface features is a phrase that refers to any grooves, notch, cut out, extrusion, cavities, ridges, or any other formation that contours a flat portion of the planar surface to have a non-flat or non-planar shape relative the flat portions that exist between them. The planar surface features are separated by these flat intermediate regions. For ease of explanation, the planar surface features describe primarily include grooves and protrusions, however, ridges, cavities, slots, and other formations that cause a deformation in a contour of the planar surface can be used in. These grooves, protrusions, and other surface features can have various shapes and sizes to achieve different waveguide or antenna characteristics. The protrusions can include convex shapes, e.g., partial spheres, formed on an otherwise flat surface or planar structure.

For example, separate structures with opposing planar surfaces may be arranged fixed about a separation plane dividing a channel formed between the planar surfaces. The channel is part of a waveguide or antenna feed network that is configured to provide an energy path for propagating electromagnetic energy. A first part of the channel is formed on the planar surface of one of the structures, between side walls of a recessed groove. A second, complimentary part of the channel part is formed by an arrangement of surface features spaced and shaped on the planar surface of the other structure. At least two of these surface features are adjacent protrusions contoured to compliment the sidewalls of the recessed groove. An area on each opposing surface between the recessed groove and the adjacent protrusions is configured to form the energy path through the channel including to prevent energy leakage from the separation plane dividing the channel.

In another example, a structure (e.g., one piece, two-pieces like above) is configured to provide a feed network for propagating electromagnetic energy along an energy path formed under the planar surface. The planar surface includes a recessed cavity with walls surrounding a cavity floor embedded within the planar surface. The cavity floor is shaped to form radiating slot(s) open through the structure to the energy path under the planar surface. A ridge feature protrudes from the planar surface on either side of the recessed cavity with a ridge length that is parallel with the cavity walls and a ridge height set to prevent cross-interference near the radiating slot within the cavity floor, thereby narrowing coverage for the electromagnetic energy within the feed network.

The described planar surface features may be particularly advantageous for use in an automotive context, such as detecting objects in a roadway in a vehicle's travel path. Preventing leakage and/or cross-interference along the energy path provided by these plate-based waveguide and antenna systems improves accuracy and performance of an underlying system (e.g., a MIMO radar system). The planar surface features can be adjusted to configure a system to provide a more precise beamwidth to detect objects appearing in a particular field-of-view. A radar system may rely on the described systems for detecting objects. When placed near a front of a forward moving vehicle, the systems can narrow a beamwidth of the radar to focus immediately in front of a vehicle trajectory and prevent detections of other objects located outside the vehicle trajectory.

These examples of using planar surface features for waveguides and antennas are just some examples of the described techniques to improve performance of waveguides and antenna systems. This document describes other examples and implementations, which can be combined in different ways for a particular application.

Operating Environment

FIG. 1 illustrates an example environment for a vehicle radar system, which uses planar surface features for waveguides and antennas. An environment 100 is depicted in FIG. 1, in which a vehicle 102 includes a device, which in this case is a radar system 104 that provides a field-of-view 106 within the environment 100 for detecting an object 108 in proximity to the vehicle 102.

The vehicle 102 may obtain radar data from the radar system 104, which can indicate a range, an angle, a range-rate, or a velocity estimated for the object 108. Although illustrated as a car, the vehicle 102 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). The vehicle 102 includes at least one automotive system (not shown for simplicity of the drawings), such as a processor, a controller, or other circuit or system, which depends on radar data output from the radar system 104. Generally, the automotive systems on the vehicle 102, or other vehicles and remote systems, can obtain radar data output from the radar system 104 to perform vehicle or driving functions. As examples of radar data, detection lists, track lists, and/or data cubes may structure information inferred from radar signals to indicate a distance, angle, range-rate, or other property of the object 108.

The radar system 104 generally includes a transmitter (not illustrated) and at least one antenna array, to transmit electromagnetic signals, in addition to a receiver (not illustrated) and at least one antenna array to receive reflected versions of these electromagnetic signals. The transmitter includes components for emitting electromagnetic signals and the receiver includes components to detect the reflected electromagnetic signals. The transmitter and the receiver can be incorporated together (e.g., on the same integrated circuit) or separately (e.g., on different integrated circuits), and may collectively be referred to as a transceiver.

Manufacturers can mount the radar system 104 to any moving platform, including moving machinery or robotic equipment. Other devices (e.g., desktop computers, tablets, laptops, televisions, computing watches, smartphones, gaming systems, and so forth) may use the radar system 104, or variation of it, based on techniques described herein, to perform non-automotive radar based functions. The radar system 104 is installed on the vehicle 102 from any exterior surface of the vehicle 102 to provide a sufficient elevation position from the ground to be able to detect the object 108 within the field of view 106 (e.g., to avoid a collision between the object 108 and the vehicle). The radar system 104 may be mounted near, or integrated within, a front portion of the vehicle 102 causes the field-of-view 106 to be directed towards the object 108. Vehicle manufacturers can integrate the radar system 104 into a rear portion, a side portion, a bumper, a mirror, a housing, a panel, headlight, taillight, or any other location on the vehicle 102 that can provide at least a portion of the field of view 106. The radar system 104 may represent a single radar device or multiple radar devices. Each radar devices can be ruggedized (e.g., behind a cover or radome, surrounded by a housing) and adapted specifically for installation on a vehicle. The radar system 104 may include a first radar device and a second radar device 104, which are positioned apart on the vehicle 102 to provide a larger field-of-view 106 than can be achieved from using a single radar device, or from positioning multiple devices closer together. Vehicle manufacturers can select the location of one or more radar devices in the radar system 104 to provide the field-of-view 106 with a particular size desired to encompasses a region of interest (e.g., in or around a travel lane aligned with a vehicle path). The radar system 104 may be configured to provide a specific field of view and/or detect a specific class of object related object avoidance and safe driving. The field-of-view 106 may be an instrumented field-of-view provided by one or more radar devices to achieve the field-of-view 106 with a desired size. Example fields-of-view 106 provided by the radar system 104 include a 360-degree field-of-view, one or more 180-degree fields-of-view, one or more 90-degree fields-of-view, and so forth, which can overlap or be combined.

Radar data may be produced from sending frames of electromagnetic signal transmissions, and processing energy associated with returns that reflect from the object 108 during each time period or frame. Detection lists, track lists, and/or data cubes are example data structures for outputting the radar data. The radar data can indicate a distance to the object 108 determined based on the time it takes for radar signals to travel from the transmitter to the object 108 and reflect back to the receiver. The radar data may indicate a location of the object 108 in terms of an angle within the field-of-view. The angle can be determined based on the direction of a maximum amplitude echo signal obtained by receiver. To generate the radar data, one or more processors and computer-readable storage media (CRM) (each not illustrated) are incorporated in each radar device of the radar system 104. The processor can be a microprocessor, a system-on-chip, a radar processor, a MIMIC, a signal processor, or other component configured to execute instructions and/or access data stored by the CRM. As an example, the processor can control the operation of the transmitter by executing instructions and control parameters programmed in the CRM. The processor may execute instructions to process the electromagnetic signals received by the antenna array(s) and other instructions to quantify energy associated with reflections. The processor generates the radar data for the automotive systems to indicate an angle, a direction, and/or a distance determined to a location of the object 108, relative the radar system 104.

Operations of the vehicle 102 are enabled with information inferred from the radar data being output from the radar system 104 to enable safe driving. For example, the processor can generate radar data based on electromagnetic energy processed from the receiver, to control a driver-assistance system, an autonomous/semi-autonomous driving system, or other automotive system of the vehicle 102 that can interface with the radar system 104 to effect vehicle functions or operations based on the radar data. The object 108 is composed of one or more materials that reflect electromagnetic signals including radar signals. Depending on the situation, the object 108 can represent a target of interest to be monitored for collision avoidance, or for maintaining a safe following distance. The object 108 can be a moving object or a stationary object, including continuous (e.g., a concrete barrier, a guard rail) or discontinuous (e.g., a traffic cone) stationary objects along a length of a road. Based on radar data about the object 108, the driver-assistance system may provide blind-spot monitoring and generate an alert indicating a potential collision with the object 108. The radar data can be used by the semi-autonomous driving system to determine whether it is safe for the vehicle 102 to perform other driving maneuvers (e.g., accelerate, decelerate, turn, proceed, or change lanes) in vicinity of the object 108. The radar data about the object 108 may configure an autonomous-driving system to drive the vehicle 102 to particular locations on a road to avoid the object 108.

Example Antenna Systems

In FIG. 1, an exploded view of the radar system 104 is shown, which depicts portions of an antenna system 110 used by the radar system 104. The antenna system 110 may include one or more aperture antennas, microstrip antennas, microstrip patch antennas, dipole antennas, substrate-integrated waveguide (SIW) antennas, slot array antennas, waveguide end-array antennas, or horn antennas. The radar system 104 emits electromagnetic radiation from the antenna system 110 by transmitting one or more electromagnetic waveforms or signals (e.g., radar signals) into the environment 100. The radar system 104 can transmit electromagnetic signals between one hundred and four hundred gigahertz (GHz), between four and one hundred GHz, or between approximately seventy and eighty GHz. Reflections (e.g., radar signals) of the transmissions are received with the antenna system 110 to detect and track the object 108.

A radiation pattern is provided by the antenna system 110 to effect correct electromagnetic signal transmission and reception. Example radiation patterns include a wide beamwidth, provide asymmetrical coverage, or provide narrow coverage in either the azimuth plane and/or the elevation plane. When the radar system 104 is placed near the front of the vehicle 102, as shown in FIG. 1, the antenna system 110 may provide a narrow beamwidth to focus on detecting objects immediately in front of the vehicle 102 (e.g., in a travel lane aligned with a vehicle path). For example, the narrow coverage can concentrate the radiated electromagnetic energy within plus or minus approximately 20 to 45 degrees of a direction following a travel path of the vehicle 102. Objects located toward a side of the vehicle 102 (e.g., ahead of the vehicle 102 and in an adjacent travel lane to the vehicle path) and outside the narrow radiation pattern are undetected or ignored. As another example, the antenna system may provide a relatively uniform radiation pattern with the radiated electromagnetic energy within plus or minus approximately 75 degrees of the travel-path direction to obtain a wide or partial front and side view of the environment 100 (e.g., to detect forward objects on either side of the travel-path). As yet another example, the antenna system 110 may provide asymmetrical coverage or an asymmetrical beamwidth that can concentrate the radiated electromagnetic energy within 30 to 90 degrees of a direction behind a travel path of the vehicle 102 (e.g., to detect rear objects on either side of the trailing travel-path of the vehicle 102, to monitor movement of a trailer or other vehicle being towed behind the vehicle 102).

The antenna system 110 includes planar features configured as electromagnetic energy paths through a waveguide or feed network section of the antenna system 110. For example, the antenna system 110 includes two structures depicted as separate plates. An upper plate is shown as a first structure 112-1 positioned adjacent to a lower plate, which is shown as a second structure 112-2. When plates are used for the first structure 112-1 and the second structure 112-2, the first structure 112-1 has a third planar surface, opposite the planar surface that is adjacent to the second structure 112-2. The second structure 112-2 has a fourth planar surface opposite the planar surface that is adjacent to the first structure 112-1. The structures 112-1 and 112-2 can be any solid material, including wood, carbon fiber, fiber glass, metal, plastic, or a combination thereof. The structures 112-1 and 112-2 can include a printed circuit board (PCB) or adjacent layers of a PCB. The structures 112-1 and 112-2 mechanically support and electrically connect components of the antenna system 110 to the rest of the radar system 104 using conductive materials formed on or beneath their mounting surfaces on the structures 112-1 and 112-2.

A separation plane 116 is maintained between the two structures 112-1 and 112-2 to preserve a small or narrow gap (e.g., approaching zero) that is precisely fixed between adjacent planar surfaces 114-1 and 114-2. The first structure 112-1 supports the first planar surface 114-1 arranged adjacent to the separation plane 116; the second structure 112-2 includes the second planar surface 114-2, which is also arranged adjacent to the separation plane 116, opposite the first planar surface 114-1. In examples like this where the two structures 112-1 and 112-2 are each separate plates, the structure 112-1 may include another planar surface opposite the planar surface 114-1. The second structures may include another planar surface opposite the planar surface 114-2.

In some cases, on either of the opposite planar surfaces from the planar surfaces 114-1 or 114-2, another arrangement of surface features may be formed to enhance the waveguide and the channel 118 through the antenna system 110. For example, the second planar surface of the structure 112-2 may include at least one radiating slot through the second structure and into the second part of the feed network. In other cases, the second planar surface of the structure 112-1 may include at least one radiating slot through the first structure 112-1 and into the first part of the feed network between the two plates.

Different from waveguide and antennas structures formed on or between opposing planar surfaces, the structures 112-1 and 112-1 are maintained fixed relative one another to maintain a narrow gap between the planar surfaces 114-1 and 114-2, which when accounted for in achieving size and dimensions of other parts of the antenna system 110, can ease manufacturing tolerances. That is, two separate parts can be produced independently and their integration can address variation that may otherwise cause one or both parts to be scrapped. These two parts are arranged adjacent and fixed about a separation plane 116. Using a clamp, fastener, conductive adhesive, or other joint material, or bonding technique, the planar surface features on each planar surfaces 114-1 and 114-2 are kept fixed opposite the separation plane 116.

The separation plane 116 divides a channel 118 that is formed between the two planar surfaces 114-1 and 114-2. Maintaining the separation plane 116 can produce a robust waveguide (e.g., for automotive use) that can be manufactured and integrated in an overall radar system without introducing complexity and reducing costs. Additionally, performance is improved over that of other single piece or two piece designs because electromagnetic energy leakage is prevented from the separation plane 116. The performance is gained from using planar surface features, as described below. The high-performance of the antenna system 110 enables more accurate vehicle perception tasks at a large cost savings, especially when produced at mass scale to support automotive demand. Less expensive technology promotes greater adoption of advanced driving functions and inclusion in non-luxury class vehicles. Automated driving, assistive driving, collision avoidance, and other advanced safety or controls may be made available to more vehicles to further advance driving safety.

The planar surface 114-1 includes a recessed groove 120 that is shaped into the first planar surface 114-1 to form a first part of the channel 118 located between parallel side walls of the groove 120. The recessed groove 120 has a rectangular shape defined by rectangular parallel sides and a floor embedded in the planar surface 114-1. Other shaped concave structures and recessed grooves, besides just rectangular shapes, may be used. Circular, elliptical, triangular, square, or other surface shapes for these concave structures can be used to extend the planar surface 114-1 further away from the separation plane 116 than other areas of the planar surface 114-1 to achieve a leak free channel with a complimentary group of structures on the planar surface 114-2.

The planar surface 114-2 includes an arrangement (e.g., a periodical arrangement) of surface features 122 spaced and shaped to form a second part of the channel 118 on the planar surface 114-1, to compliment and align about the separation plane 116 from the first part of the channel 118 shaped by portions of the planar surface 114-1 that are associated with the recessed groove 120. The surface features 122 may include protrusions, such as convex structures that extend the planar surface 114-2 closer to the separation plane 116 than other areas of the planar surface 114-1 that are in between the surface features 122. It should also be noted that each of the planar surfaces 114-1 may include a mixture of grooves and protrusions, or a mixture of concave and convex surface structures to generate a waveguide or antenna feed network for a particular design.

The size, shape, and/or arrangement of the recessed groove 120 and the surface features 122 are precisely aligned to achieve the inner dimensions of the channel 118. These channel dimensions are set according to the desired electromagnetic signal wavelength for transmitting or receiving with the radar system 104 to detect the object 108 and provide the field of view 106. When placed about the separation plane 116, the recessed groove 120 and the surface features 122 combine to bound a region from the groove 120 and beyond the separation plane 116 to form the channel 118 under a cavity formed between the separation plane and adjacent protrusions among the planar surface features 122 that complement the sidewalls of the groove 120, to configure the channel 118 as an energy path to propagate electromagnetic signals through the antenna system 110.

To prevent energy leakage from the separation plane 116 dividing the channel 118 and energy path contained within, at least two adjacent surface features 122 are configured as adjacent protrusions that are aligned with opposing side walls of the recessed groove 120. Their alignment to the recessed groove 120 bounds an area of the second planar surface 114-2 located on and between the adjacent protrusions 122 to be configured as the second part of the channel 118. A portion of the second planar surface 114-2 at each of the adjacent protrusions 122 is contoured to a different opposing side wall of the recessed groove 120. Between the adjacent surface features 122, the energy path is provided through the channel 118. These and the other surface features 122 are further arranged, shaped, and spaced to prevent energy leakage from the channel 118 near the gap at the separation plane 116 dividing the channel 118.

Although primarily described as being a hollow cavity filled with air, the channel 118 may be filled with other dielectric materials besides air. The channel 118 is configured to contain a dielectric material in various forms (e.g., gas, solid, or liquid). If a dielectric material other than air fills the channel 118, the dielectric material has material properties suitable for propagation of electromagnetic energy in the environment 100.

Example Waveguides

Figures 1, 2:
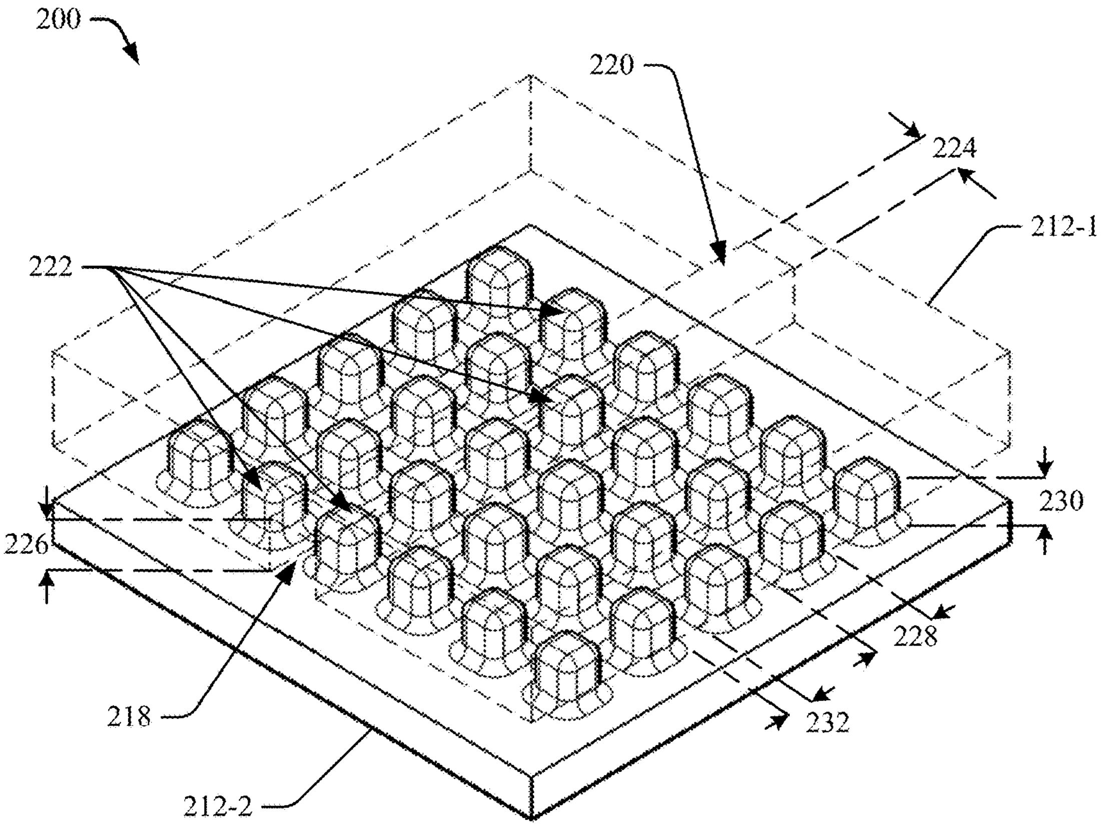
Figure 2:
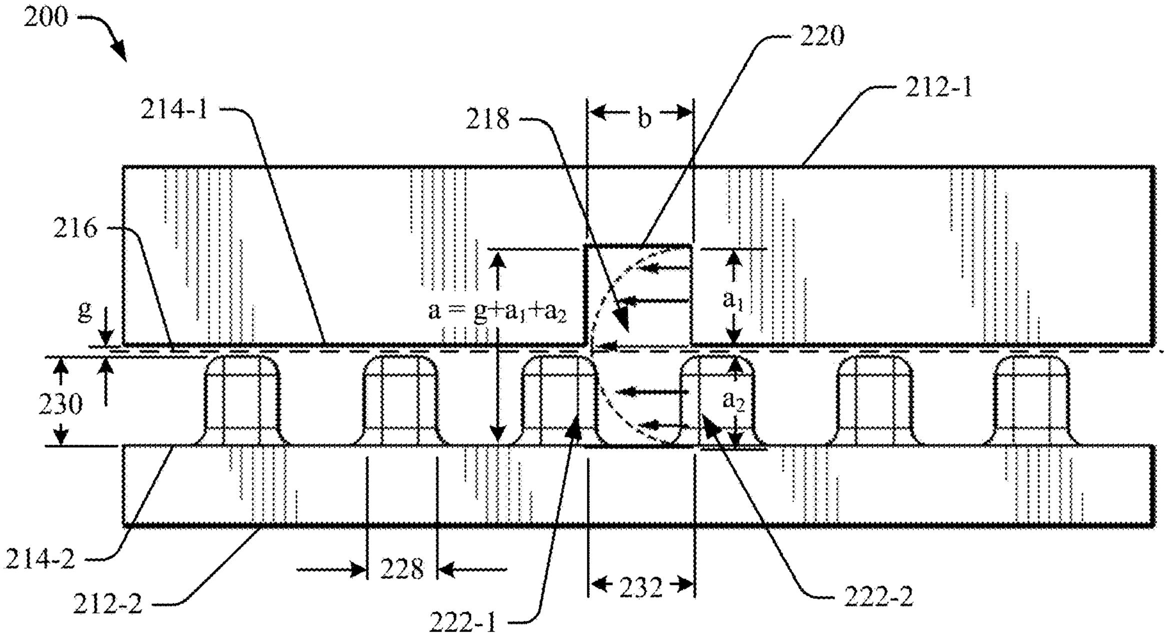

FIGS. 2-1 and 2-2 illustrate views of an example of a waveguide 200 provided by planar surface features. The waveguide 200 is an example part of the antenna system 110 formed between the structures 112-1 and 112-2. FIGS. 2-1 shows an isometric view of the waveguide 200, and FIG. 2-2 includes a corresponding side view of the waveguide 200. The waveguide 200 is composed of two pieces of plates and includes a first structure 212-1 and a second structure 212-2.

A planar surface 214-1 of the structure 212-1 includes a groove 220 that forms part of a channel 218. A groove width 224 and a groove depth 226 for the channel 218 are shown in FIG. 2-1. The structure 212-1 can include multiple groove channels like the groove 220. In this case, the groove 220 is rectangular, and a rectangular input to the channel 218 is provided at one end of the groove 220. In other examples, the input to the channel 218 can have a different shape, such as a rounded corner rectangular shape, a circular shape, an elliptical shape, or other contour that matches the shape of the channel 218. The channel 218 may be ovular, circular, or other concave shape that forms one piece (e.g., an upper part) of the channel 218.

A planar surface 214-2 of the structure 212-2 includes an arrangement of surface features 222, which include protrusions or convex structures that extend portions of the planar surface 214-2 to be closer to the planar surface 214-1 than other areas of the planar surface 214-2 located between the surface features 222. When complimented with the planar surface 214-1 and the groove 220, the arrangement of surface features 222 not only configure the channel 218 for propagating electromagnetic energy, but the surface features 222 also contain the energy path to be within bounds of the channel 218. The surface features 222 are arranged and shaped about the planar surface 214-2 to prevent energy leakage (e.g., near a separation plane 216), which may otherwise occur with two-part channel structures.

A separation plane 216 is adjacent to the planar surface 214-1 and the planar surface 214-2. The surface features 222 each have a protrusion length/width 228 and a protrusion height 230. A separation distance 232 relative the separation plane 216 between pairs of the surface features 222 is also shown. The protrusion height 230 extends the planar surface 214-2 on each of the surface features 222 towards the separation plane 216 and the planar surface 214-1. The protrusion length/width 228 increases an occupied area of the planar surface 214-1 associated for that protrusion. Each of the surface features 222 is spaced by the separation distance 232 from at least one other adjacent surface feature. The separation distance 232 is a distance, relative the separation plane 216.

The surface features 222 may be arranged in various patterns. The arrangement, and dimensions of the surface features 222, including the separation distance 232 between them, may vary or be consistent across different regions of the planar surface 214-2. In a periodic pattern, the protrusion height 230, the protrusion length/width 228, and/or the separation distance 232 may be the same across different regions of the planar surface 214-2. The surface features 222 may be a same shape and size as shown, or they can be different shapes and sizes (as provided in examples described below). The surface features 222 are shown arranged in a grid pattern as an example periodic arrangement of equally sized and spaced surface features 222. That is, the surface features 222 appear in FIGS. 2-1 and 2-2 to be approximately equal sized and shaped surface protrusions arranged in a grid pattern having rows and columns equally spaced by the separation distance 232 on the planar surface 214-2. The grid includes five rows and six columns, other sized grids may be used.

The channel 218 may be one of multiple channels 218 formed between the planar surface 214-1 and 214-2. Multiple grid or other types of arrangements of the surface features 222 can be used, including other rectangular patterns or circular patterns to align the surface features 222 on the planar surface 214-2 to other features on the planar surface 214-1, e.g., enable different routing options for other parts of the energy path that are beyond the channel 218. In addition to variation in pattern, variation in any one or more of the protrusion height 230, the protrusion length/width 228, or the separation distance 232 produces an aperiodic pattern for the arrangement of the surface features 222 at different regions of the planar surface 214-2. For example, the other drawings provide examples of other periodic and aperiodic arrangements of planar surface features for waveguides and antennas.

An aperiodic pattern can exist among the surface features 222 with just small variations in shape, size, or positioning of the surface features 222. A first group of the surface feature 222 may be precisely shaped and spaced surface features 222 positioned on the planar surface 214-2 arranged near the groove 220. A second group of the surface features 222 is arranged on the planar surface 214-2 to be further away from the groove 220. In comparison to the first group, the second group may be too far from the groove 220 to effect performance of the channel 218; too great a distance from the channel 218 reduces the effect of the surface features 222 contribution to preventing electromagnetic energy leakage from the channel 218. Therefore, because their precision will have less performance improvement than the first group, the surface features 222 in the second group may be sized and/or spaced differently (e.g., with less precision) when positioned far from the channel 218, which may reduce manufacturing complexity and/or costs.

The surface features 222 may have precise shapes and dimensions that configure the planar surface 214-2 to provide other benefits beyond preventing channel leakage. Some of the surface features 222 may be different shapes or sizes to provide inputs, outputs, power dividers, radiators, tunnels, or other electromagnetic features connecting the channel 218 to other portions of the antenna system 110. The second group of the surface features 222 can be configured for mechanical purposes, such as improving strength, robustness, or stability of the two structures 212-1 and 212-2. The surface features 222 of the planar surface 214-2 may mate with other surface features on the planar surface 214-1, such as pins, holes, and alignment markers configured to support fasteners or other joints that maintain precise alignment between the surface features 222 and the groove 220.

Achieving precision in the channel dimensions may improve performance of the channel 218. Forming the groove 220 and the surface features 222 to configure the channel 218 for a desired electromagnetic energy wavelength is achievable through ensuring dimensions (e.g., height and width) of the channel 218 are accurate and consistent to a high degree of precision. The dimensions of the channel 218 include a channel width and a channel height, which respectively correspond to the narrow b dimension and the broad a dimension of the waveguide 200.

The channel width corresponds to the groove width 224 and the separation distance 232 between adjacent pairs of the surface features 222. Each dimension that sets the channel width is around one quarter of the desired electromagnetic wavelength (e.g., between one eighth and one half the wavelength), which may prevent higher order mode transmissions within the channel 218. The channel width is set to be consistent between the groove width 224 and the separation distance 232 throughout the channel 218.

As shown in FIG. 2-2, the channel height is labeled as a, which is equal to a sum of the groove depth 226 being used for the dimension $a_1$, the protrusion height 230 being used for the dimension $a_2$), and a gap distance g. The channel height a is provided by Equation 1:

$$a=g+a_1+a_2 \quad \text{Equation 1.}$$

In total, the broader a dimension of the waveguide 200 is larger than one half a desired wavelength for the channel 218, unlike other waveguide designs where the broader a dimension is less than or equal to one half the desired wavelength. The groove depth 226 and the protrusion height 230 are each set to be around one quarter of the desired electromagnetic wavelength. The groove depth 226 may be equal to the protrusion height 230, or one may be greater than the other. Their combination with the gap distance g produces a larger than normal a dimension, which allows the gap distance g to reduce complexity in manufacturing, without losing performance.

The gap distance g is maintained about a separation plane 216 arranged between the planar surface 214-1 and the planar surface 214-2. The groove 220 and the surface features 222 are contoured to combine with the gap distance g to provide a consistent channel height throughout the channel 218. The gap distance g is between zero and one fifth of the desired electromagnetic energy wavelength for the channel 218. A bonding material or other surface variation between the structures 212-1 and 212-2 may cause some or all of the gap distance g between the two planar surfaces 214-1 and 214-2. However, no bonding material is necessary. Normally, any gap is avoided in two-part waveguide designs or complex manufacturing techniques and joining processes are involved to support mass production. In contrast, the gap distance g is incorporated in the waveguide 200 intentionally to act as part of the channel 218. The gap distance g is intentionally preserved to achieve a desired broad dimension of the channel 218. When precisely aligned about the separation plane 216, opposing regions of the planar surface 214-1 and 214-2, form a seemingly uniform conductive surface in the broad a dimension, which extends from the planar surface 214-1 contained within the groove 220, beyond the gap distance g, and to portions of the planar surface 214-1 located on adjacent surface features 222 aligned opposite the groove 220.

As some examples, the groove depth 226 and the protrusion height 230 may be approximately equal. In that case, the gap distance g, and the separation plane 216 divide the channel between two halves of the broader side of the channel 218. Energy leakage from between these halves is less than other cases where the groove depth 226 and the protrusion height 230 are not equal. However, even when the groove depth 226 and the protrusion height 230 are quite different, their combination still provides the correct broad a dimension in combination with the gap distance g. The surface features 222 have convex protrusions shaped and spaced to trap and prevent leakage from between the two parts on either broadside of the channel 218. The gap distance g can be maintained using a variety of attachment features, with or without using bonding materials (e.g., note bonding materials may provide some or all of the gap distance g). Unlike some other waveguides, a larger a dimension of greater than one half the desired wavelength is enabled in the waveguide 200, which can allow for greater tolerance in the groove depth 226 and/or the protrusion height 230 by adopting the gap distance g between two mating parts of the waveguide 200 design, to enhance rather than diminish performance of the channel 218.

Achieving precise final dimensions configures the channel 218 for a desired electromagnetic energy wavelength. Final dimensions of the channel 218 are achieved by fixing the two structures 212-1 and 212-2 to be in precise alignment about the separation plane 216, with the gap distance g preserved between the two structures 212-1 and 212-2. By aligning the groove 220 to be opposite the separation plane 216 from portions of the planar surfaces 214-2 that are between adjacent surface features 122, inner surfaces of the channel 218 extended beyond the gap distance g to complete the channel 218.

The surfaces of the channel walls provided between the surface features 222 and the groove 220 are precisely contoured to with the gap distance g to achieve a smooth transition between the two structures 212-1 and 212-2. The gap distance g combines with the protrusion height 230 and the groove depth 226 to achieve the correct broad dimension for the channel 218. Ensuring the precise gap distance g also improves performance with regards to preventing energy leakage from the channel 218. The gap distance enables the surface features 222 to form electromagnetic energy barriers to prevent or at least reduce some electromagnetic energy leakage near the separation plane 216 dividing the channel 218. The surface features 222 combine with the gap distance g to from portions of the planar surface 114-2 configured to contain electromagnetic energy and prevent leakage from the channel 218. This way, when used in combination with the antenna system 110, the channel 218 can guide electromagnetic waves in a cavity formed between adjacent planer surfaces 214-1 and 214-2 between the groove 220 and adjacent surface features 222 aligned about the gap distance g to the groove 220.

Example Antenna Systems

Figures 1, 3:
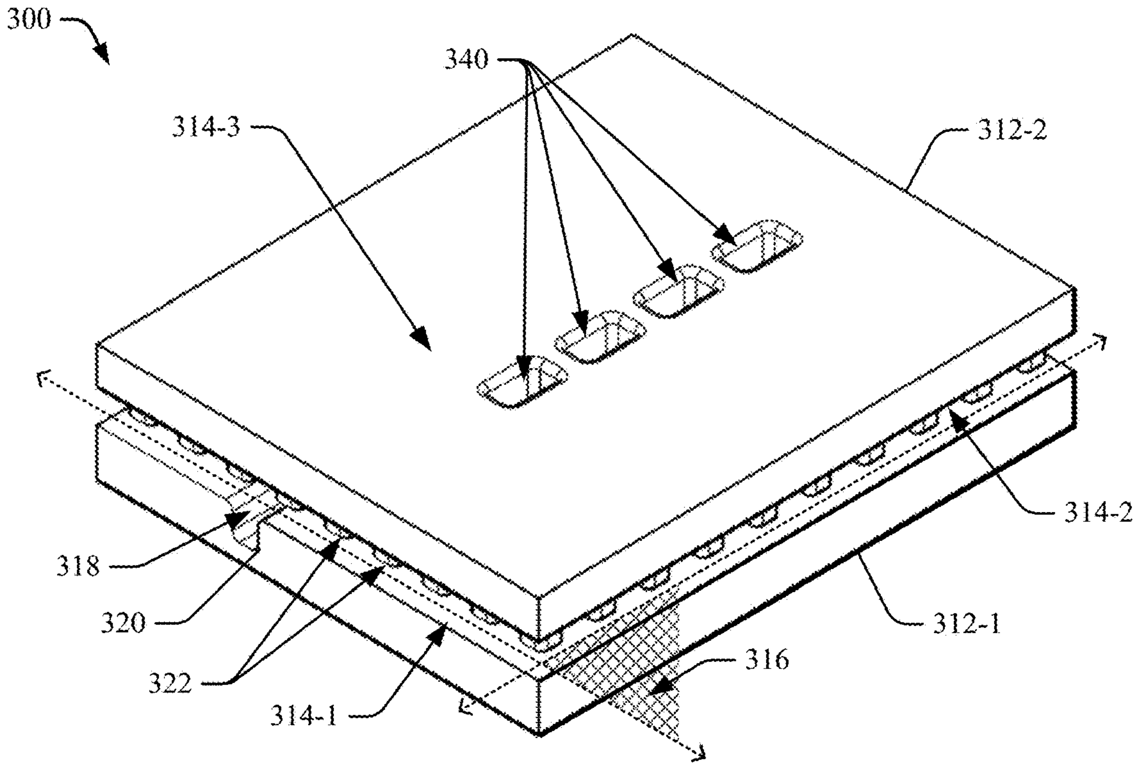
Figures 2, 3:
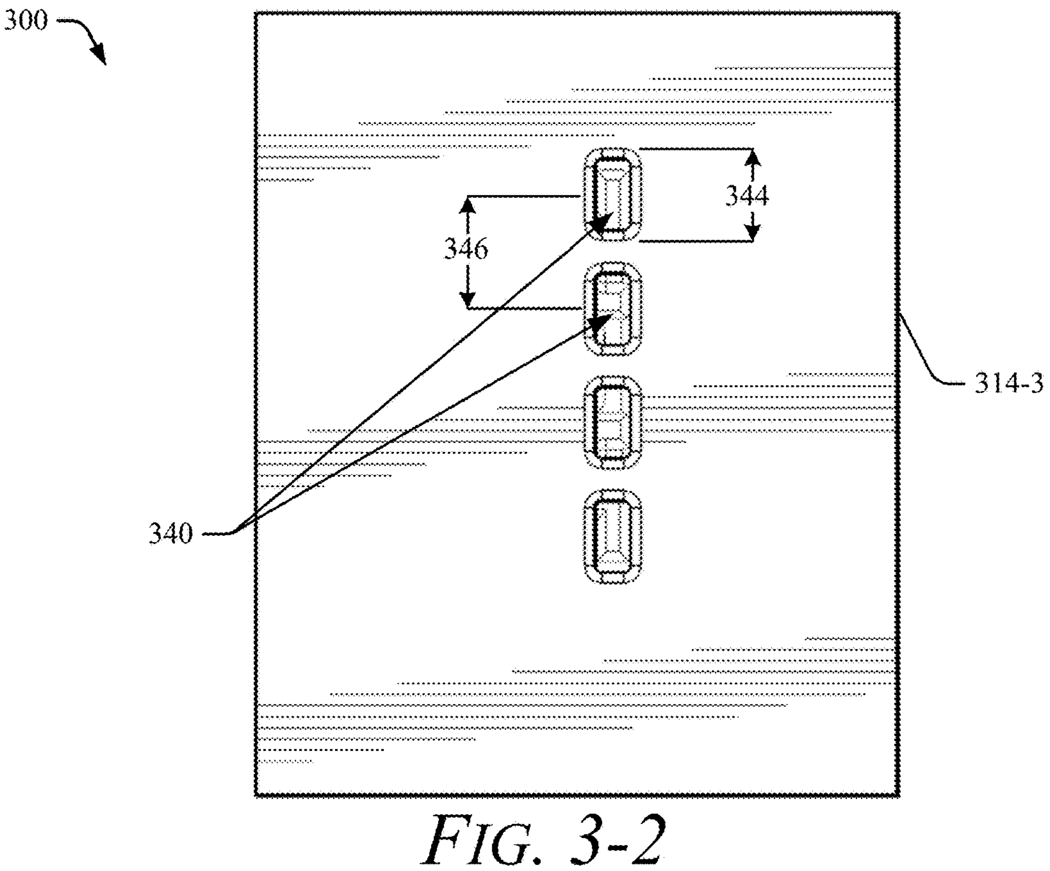
Figure 3:
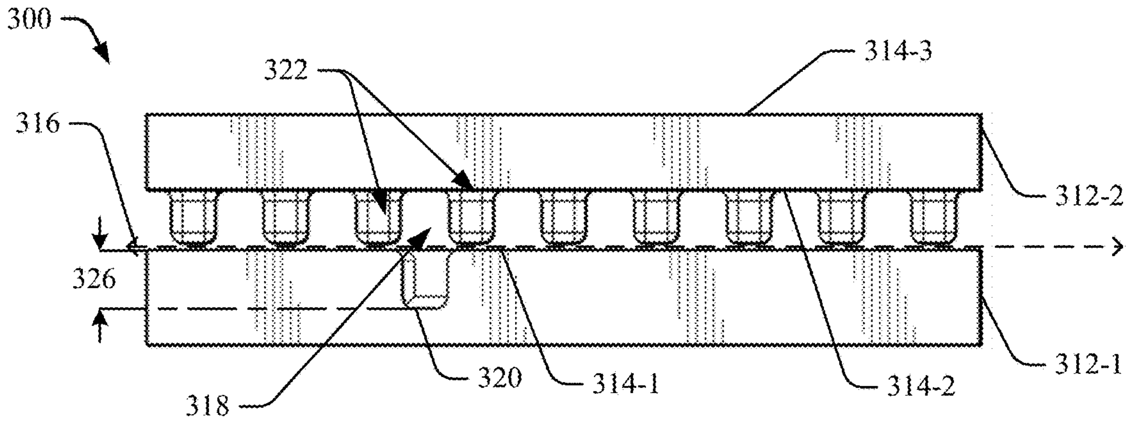
Figures 3, 4:
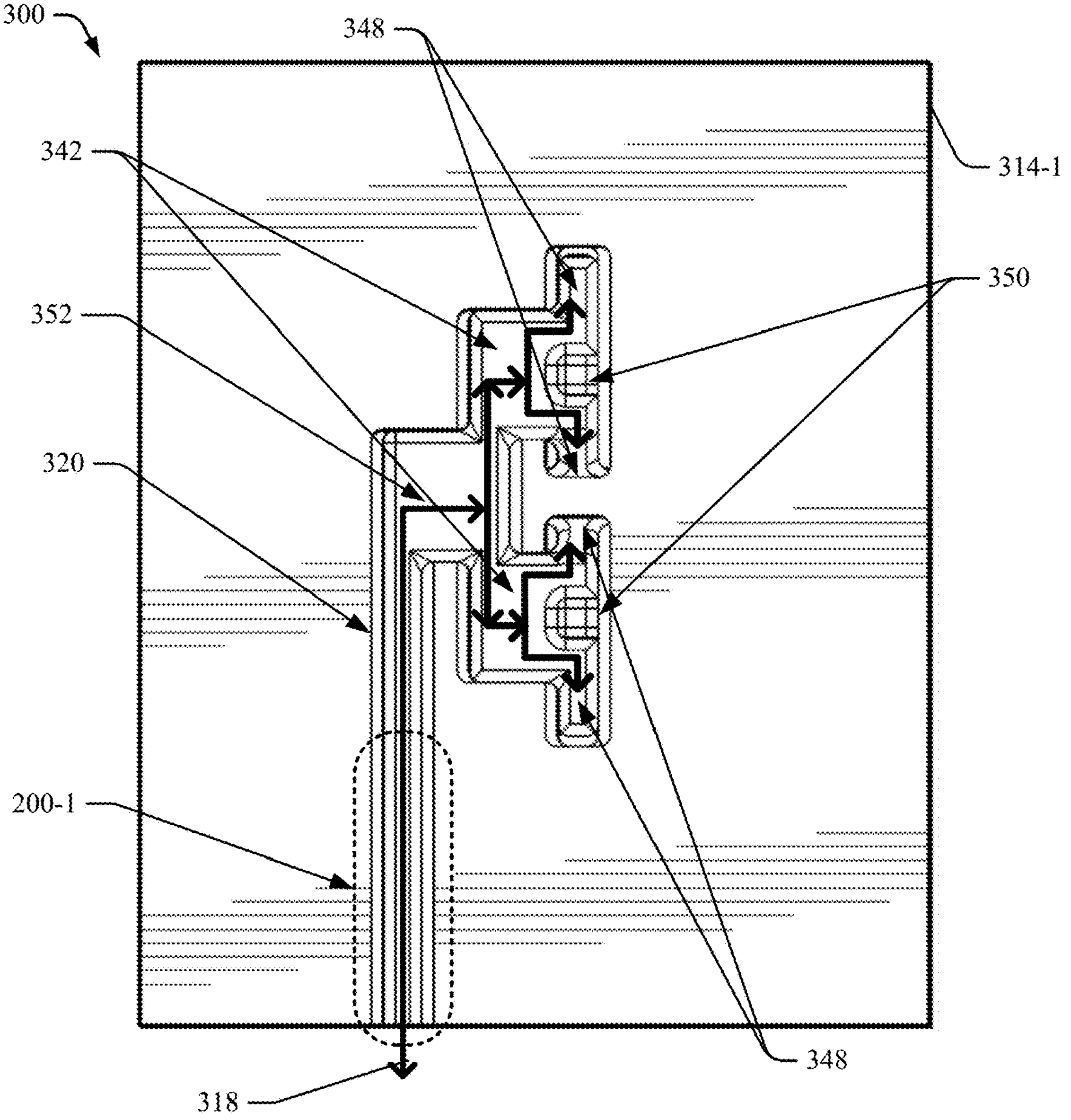
Figures 3, 4, 5:
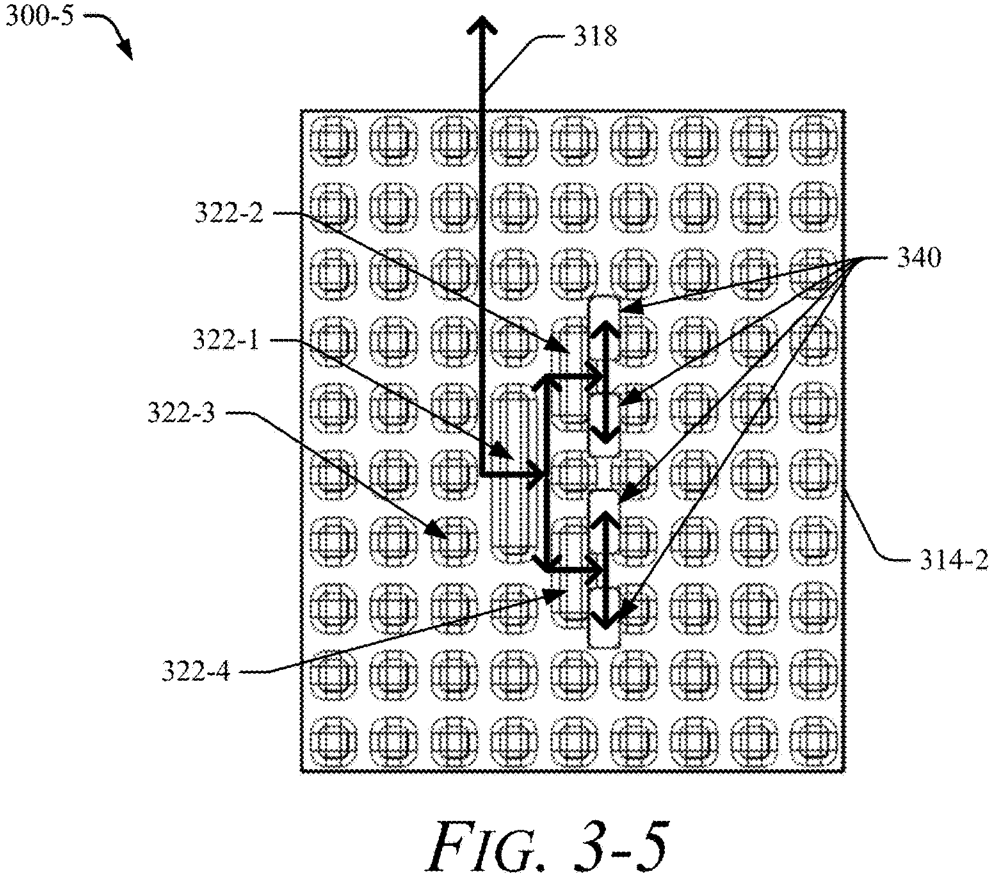

FIGS. 3-1 through 3-6 illustrate views of an example antenna system 300, or parts thereof, provided by planar surface features. FIG. 3-1 illustrates an isotropic view of the antenna system 300, FIG. 3-2 illustrates a top down view of the antenna system 300, and FIG. 3-3 illustrates a side view of the antenna system 300. FIG. 3-4 illustrates planar surface features arranged on a planar surface of a first structure the antenna system 300, and FIG. 3-5 illustrates planar surface features arranged on a planar surface of a second structure the antenna system 300. FIG. 3-6 illustrates an isotropic view of a feed network formed between the planar surfaces features of the first and second first structures.

The antenna system 300 may be a portion of the antenna system 110, which uses planar surface features to form a power divider for a feed network 318 that contains an energy path for electromagnetic energy being transmitted or received with the antenna system 300. A waveguide, a power divider, a coupling tunnel, an iris, an output, and a radiating slot are some examples of antenna components or features formed between planar surface features, in accordance with the described techniques. Portions of the antenna system 300 may be omitted, duplicated, or combined with the other examples described herein to form other feed network designs.

The antenna system 300 includes a first structure 312-1 and a second structure 312-1. The structures 312-1 and 312-2 are examples of the structures 112-1, 112-2, 212-1 and 212-2, and are formed of any materials that may be used to support antenna components embedded on or within the planar surfaces 314-1, 314-2, and 314-3. The first structure 312-1 provides a first part of a feed network 318 (e.g., a channel 318) for electromagnetic energy to propagate through the antenna system 300. In this example, the feed network 318 is configured as a power divider that joins a single input to multiple outputs of the antenna system 300. The second structure 312-2 provides a complimentary, second part of the feed network 318 and is shaped to align with a shape of the first part provided by the structure 312-1.

The first structure 312-1 provides the first part of the feed network 318 with a recessed groove 320 formed in a first planar surface 314-1 arranged adjacent to a separation plane 316. The separation plane 316 divides the first part of the feed network 318 from the second part.

The second structure 312-2 provides the second part of the feed network 318 with an arrangement of surface features 322 formed on a second planar surface 314-2. The second planar surface 314-2 is arranged adjacent to the separation plane 316, and opposite the first planar surface 314-1.

Although not shown, a separation gap, referred to as a gap distance g, is located about the separation plane 316. This distance between the planar surfaces 314-1 and 314-2 is controlled about the separation plane 316 to properly size and shape inner dimensions of the two parts of the feed network 318. Ensuring precision of the gap distance g may achieve inner dimensions needed to configure the two parts of the feed network 318 to provide complimentary parts of an energy path for a desired wavelength of electromagnetic energy. The gap distance g may be zero, near zero, less than one quarter of the wavelength, less than a groove depth of the groove 320, and/or less than a protrusion height of the surface features 322. The gap distance g may result from a manufacturing step performed to produce the antenna system 300 from the two parts. For example, the antenna system 300 is produced by fixing the two structure 312-1 and 312-2 together with a joint provided about the separation plane 316. A thickness of the joint can be controlled to achieve consistency in the gap distance g. A uniform thickness associated with adhesives, mechanical fixtures, tapes, welds, or other joint materials may be specified to maintain structural alignment between the structures 312-1 and 312-2 and achieve consistency the gap distance g between them.

The first part of the feed network 318 is provided by planar surface features in the planar surface 314-1 of the structure 312-1. Shown as the recessed groove 320, the planar surface features formed in the planar surface 314-1 provide a shape and contour for the first part of the feed network 318 between walls of the groove 320. Similar to the groove 220 formed in the structure 212-1, the groove 320 is contoured to achieve precise dimensions that compliment dimensions of the second part and the gap distance g.

The arrangement of surface features 322 on the planar surface 314-2 provide the planar surface features for the second part of the feed network 318, to compliment the groove 320 for the first part. The surface features 322 protrude from the planar surface 314-2 and extend surface areas to be closer to the separation plane 316 than other areas of the planar surface 314-2 that between the surface features 322. The arrangement of the surface features 322 formed on the second planar surface 314-2 are spaced and shaped to compliment or provide a smooth transition with sides of the recessed groove 320. For example, at least two surface features 322 in the arrangement include adjacent protrusions aligned with opposing side walls of the recessed groove 320. This alignment bounds an area of the second planar surface 314-2 located on and between these adjacent protrusions 322 to form the second part of the feed network 318 that mates to the first part formed by the groove 320. A portion of the second planar surface 314-2 at each of the adjacent protrusions 322 is contoured to a different opposing side wall of the recessed groove 320. This contour, which smooths a transition beyond the gap distance g, also configures an energy path between by the adjacent protrusions 322 and walls of the groove 320 for propagating electromagnetic energy through the feed network 318. When combined about the separation plane 316, the surface features 322 complete the feed network 318 with the groove 320 to form the energy path between planar surface features of the two planar surfaces 314-1 and 314-2. Maintaining separation between the two structures 312-1 and 312-2 about the separation plane 316, in combination with precise sizing and positioning of the surface features 322 arranged on either side of the groove 320, configures the feed network 318 to prevent energy leakage from near the separation plane 316.

To configure the feed network 318 to transmit or receive electromagnetic signals from the environment 100, the second structure 312-2 also includes a third planar surface 314-3, arranged on an opposite side of the structure 312-2 as the second planar surface 314-2. The structure 312-2 includes one or more radiating slots 340 formed in the third planar surface 314-3. The radiating slots 340 couple the feed network 318 to the environment 100 to enable signal propagation via the antenna system 300.

At least one of the radiating slots 340 is formed through the second structure 312-2 and into the second part of the feed network 318 formed by the second planar surface 314-2 (e.g., located on and between the surface features 322 aligned opposite the recessed groove 320). Each of the radiating slots 340 provides a tunnel through the structure 312-2 between respective openings formed in each of the planar surfaces 314-2 and 314-3. The radiating slots can be rectangular shape, oval shape, dog bone shape, or any other shape. A slot length 344 is shown relative a slot spacing 346 in FIG. 3-2. As an example, the slot length 344 is around one half or larger a desired wavelength for the feed network 318. The slot spacing 346 is measured between centers of two adjacent slots 340, and is less than the desired wavelength (e.g., three fifths of the desired wavelength).

The feed network 318 is configured as a power divider network. In this example, an input waveguide 200-1, which is an example of the waveguide 200, provides an input portion of the power divider. The input waveguide 200-1 includes a single channel formed between the surface features 322 and a portion of the groove 320 to contain a portion of the energy path through the feed network 318.

The power divider also includes a second part of the feed network 318, which provides a coupling tunnel 352 arranged between the input portion and an output portion of the power divider. The output portion of the power divider includes multiple divider outputs 348. The coupling tunnel 352 provides a lateral connection adjacent to the separation plane to provide a transition or interface between the input waveguide 200-1 and two output waveguides 342.

The output waveguides 342 each include an iris 350 arranged between a pair of the divider outputs 348. The iris 350 is optional and may provide better performance when matching two parts of the feed network 318. In this example, the power divider has four divider outputs 348; any other quantity of two or more divider outputs may be used in other examples of the power divider. In the antenna system 300, each of the divider outputs 348 corresponds to one of the radiating slots 340. In some other examples, multiple divider outputs 348 are combined to provide a single combined output coupled to one corresponding radiating slot 340.

The divider outputs 348 of each divider stage of the feed network 318 correspond to at least one of the radiating slots 340. The radiating slots 340 are formed through the structure 312-2 to include a single slot formed into a corresponding divider output 348. In other examples, a single radiating slot 340 may correspond to a group or combination of the divider outputs 348.

The groove 320 and the adjacent surface features 322 near the groove 320 may have dimensions that change shape and direction depending on their location within the feed network 318. For example, the input waveguide 200-1 may have channel dimensions that are larger or smaller than individual or combined dimensions of the output waveguides 342. The coupling tunnel 352 tapers or transitions the different dimensions along the feed network 318 to join the channel in the input waveguide 200-1 with that in each of the output waveguides 342.

FIG. 3-5 shows the arrangement of the surface features 322 on the planar surface 314-2, relative the feed network 318 and the radiating slots 340. The arrangement of the surface features 322 includes a grid arrangement of the surface features positioned in one or more rows and columns. However, a group of the surface features 322 are sized differently or distributed differently on the planar surface 314-2 compared to other surface features 322. That is, unlike the surface arrangements 222, which are distributed evenly on the planar surface 214-2, the arrangement of the surface features 322 include some surface features that are distributed unevenly on the planar surface 314-2. In the arrangement of the surface features 322, at least two of the surface features are a different shape, spacing, and/or size.

At least two of the surface features are sized and shaped to prevent energy leakage from the coupling tunnel 352 or other portions of the feed network 318, which change dimension or direction of the energy path. For example, to form the coupling tunnel 352, the surface feature 322-1 has a greater length than other surface features 322-3 to provide a tunnel length along the surface feature 322-1, which is consistent with a length of the groove 320. The length of the coupling tunnel 352 may be around one half or larger a desired wavelength for the feed network 318. The tunnel length achieved with the surface feature 322-1 may produce a narrow opening at the interface with the output waveguides 342. To form a divider stage including one of the output waveguides 342, the surface feature 322-2 and the surface feature 322-4 are separated by one of the other surface features 322-3. The surface features 322-2 and 322-4 are similarly sized to have a shorter length than the surface feature 322-1, but which is longer than the other surface features 322-3.

The feed network 318 provided by the antenna system 300 is one example of a four-slot antenna using a power divider with three power dividing stages to feed four radiating slots. The antenna system 300 can be modified to change the feed network 318 to support different quantities of slots and/or dividing stages depending on the radar system 104. For example, a corresponding output of each power divider stage may feed two separate radiating slots; seven power divider stages can feed eight radiating slots by combining a corresponding output of one pair of the power divider stages to feed a single radiating slot.

Figures 3, 4, 5, 6:
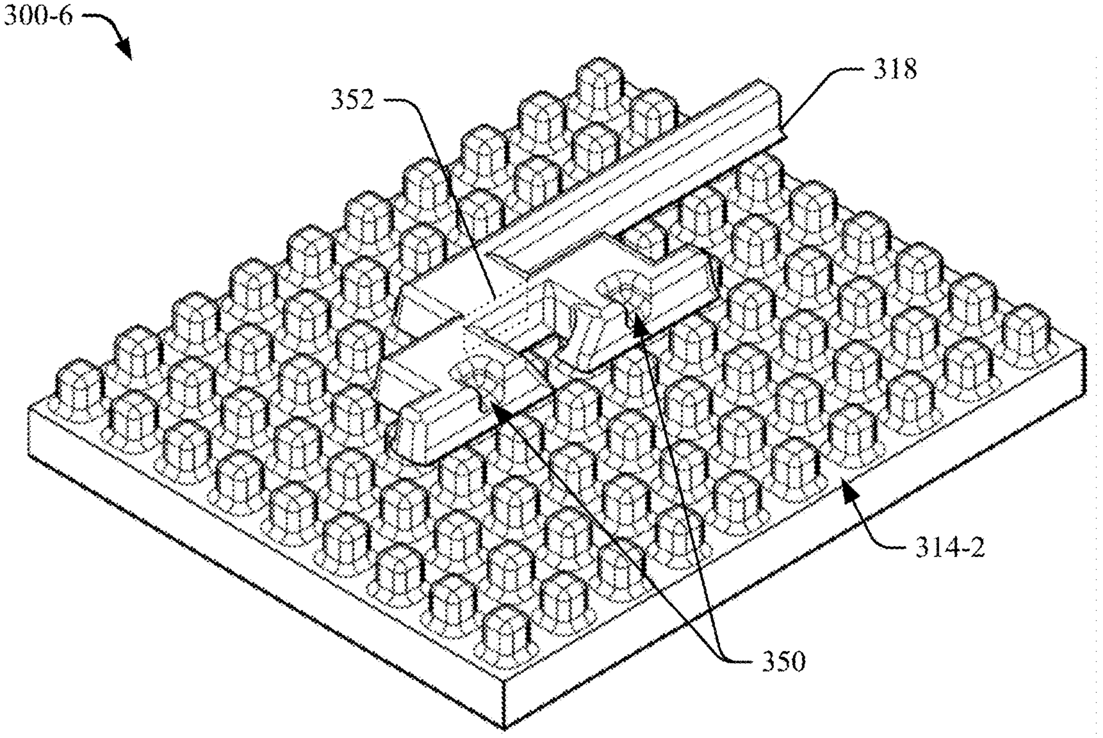
Figures 1, 4:
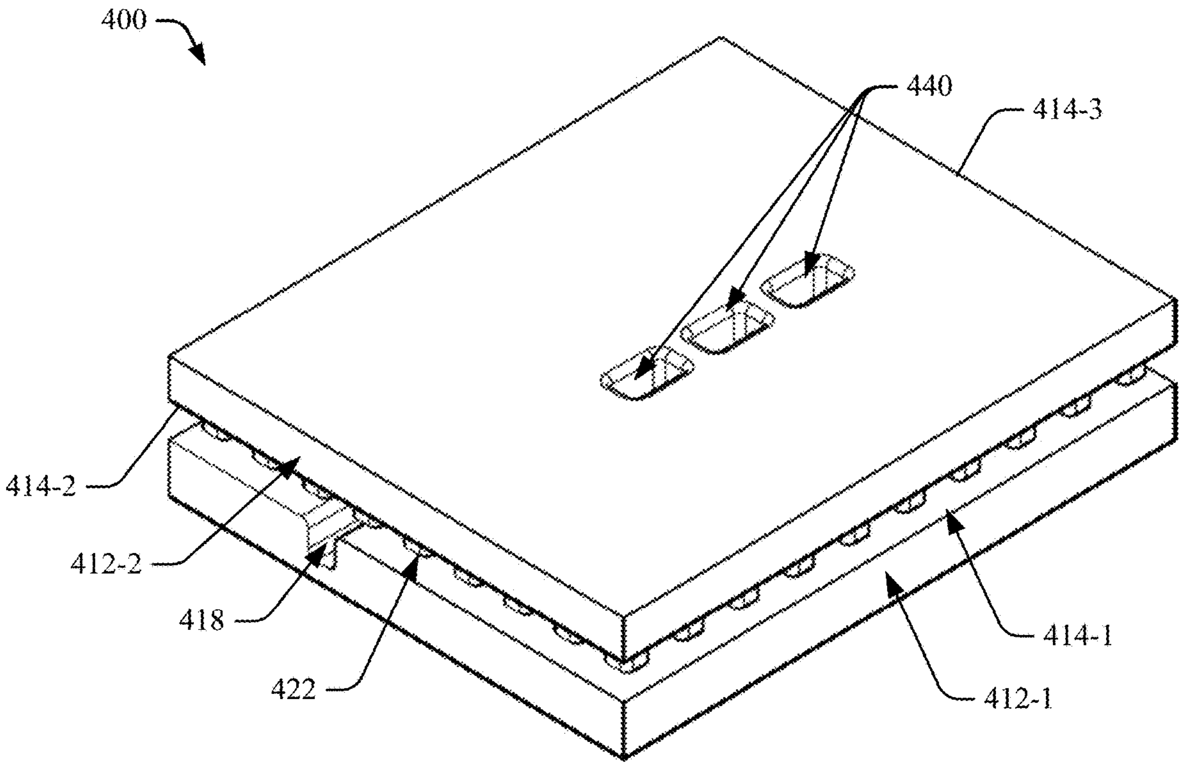
Figures 2, 4:
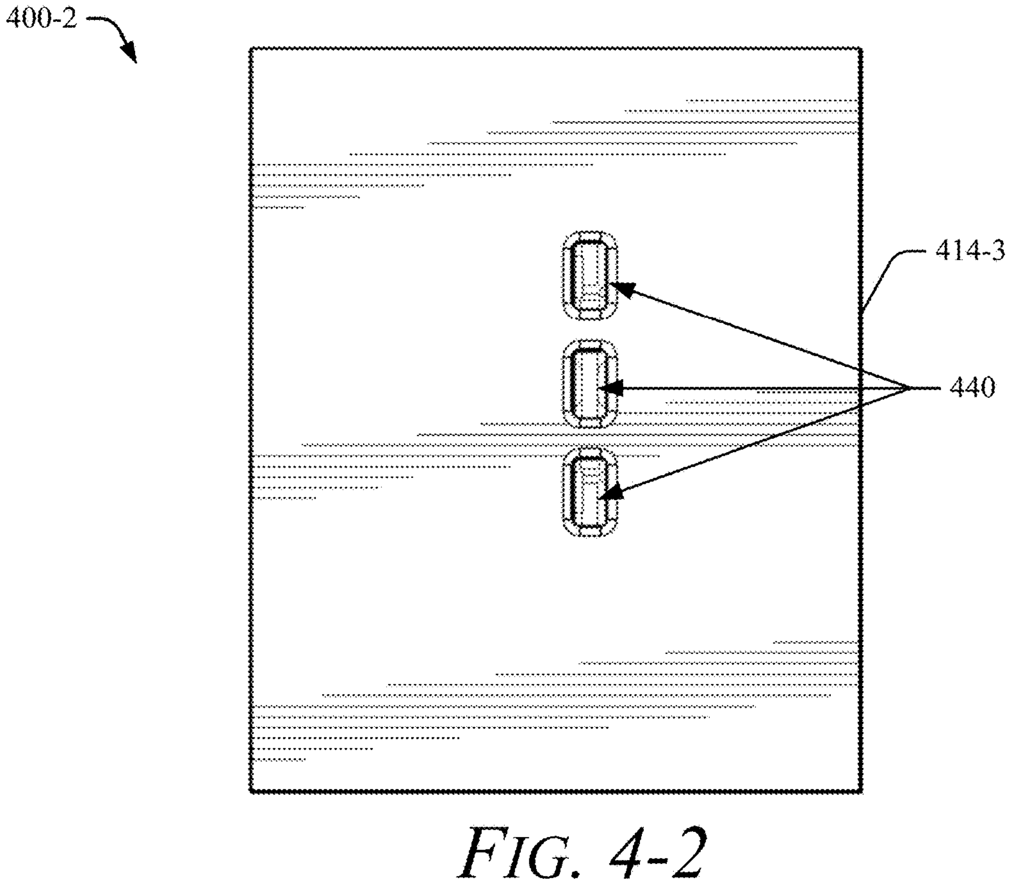
Figures 3, 4:
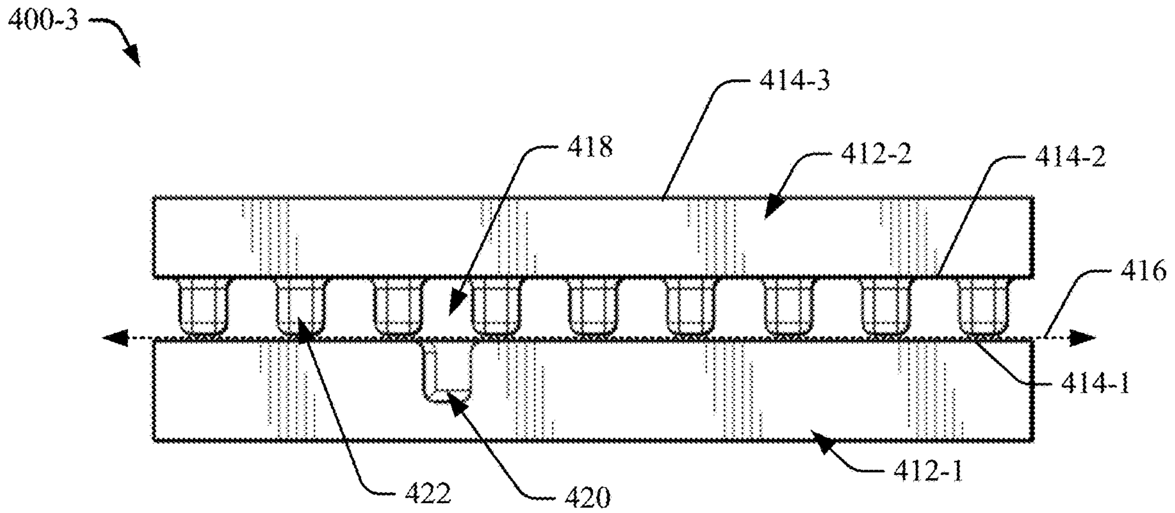
Figure 4:
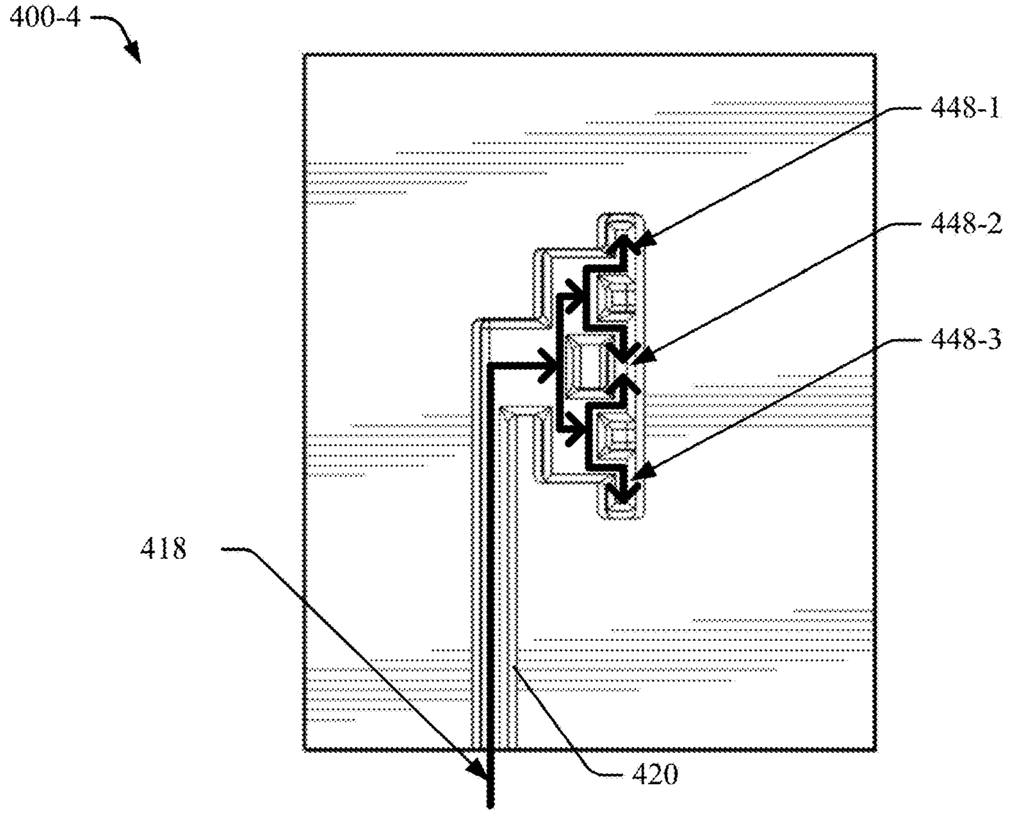
Figures 4, 5:
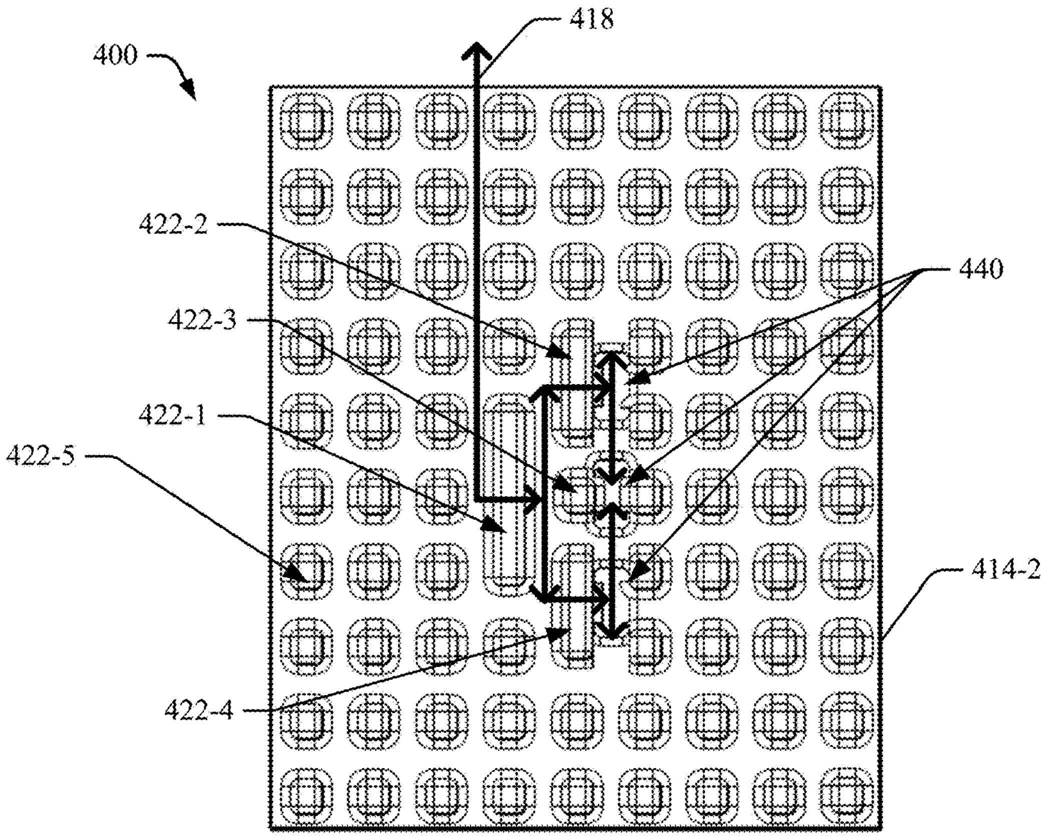
Figures 4, 5, 6:
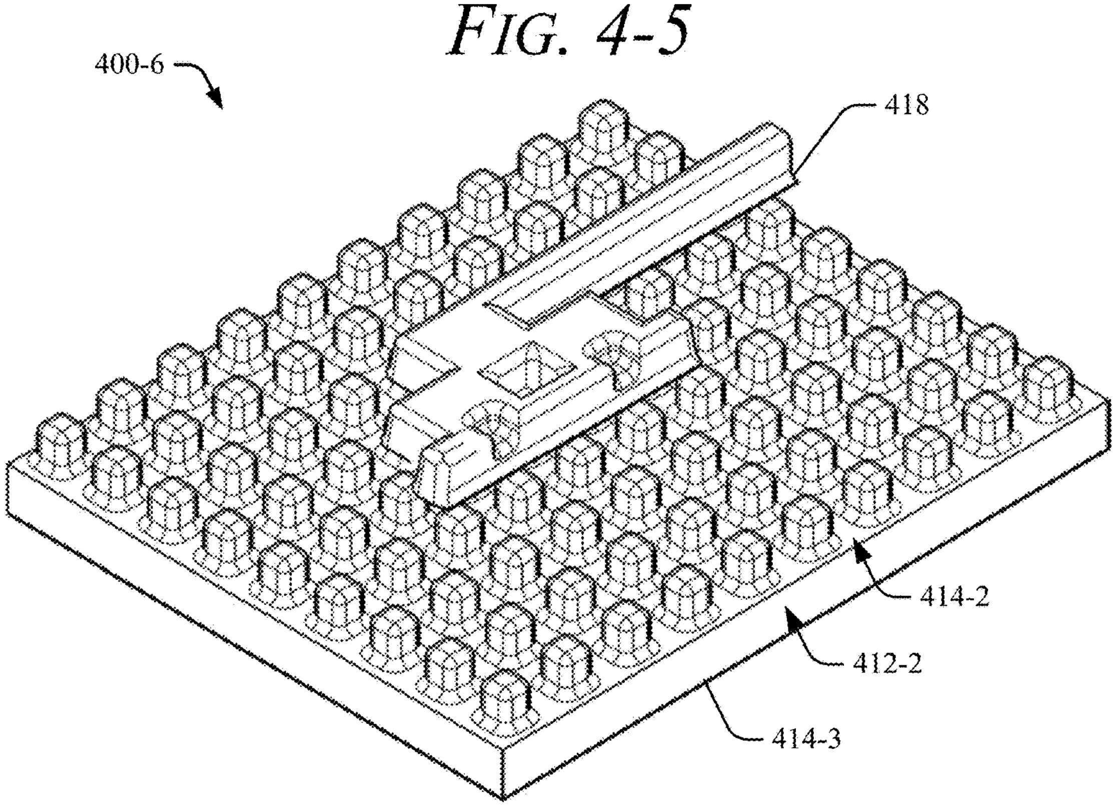
Figure 5:
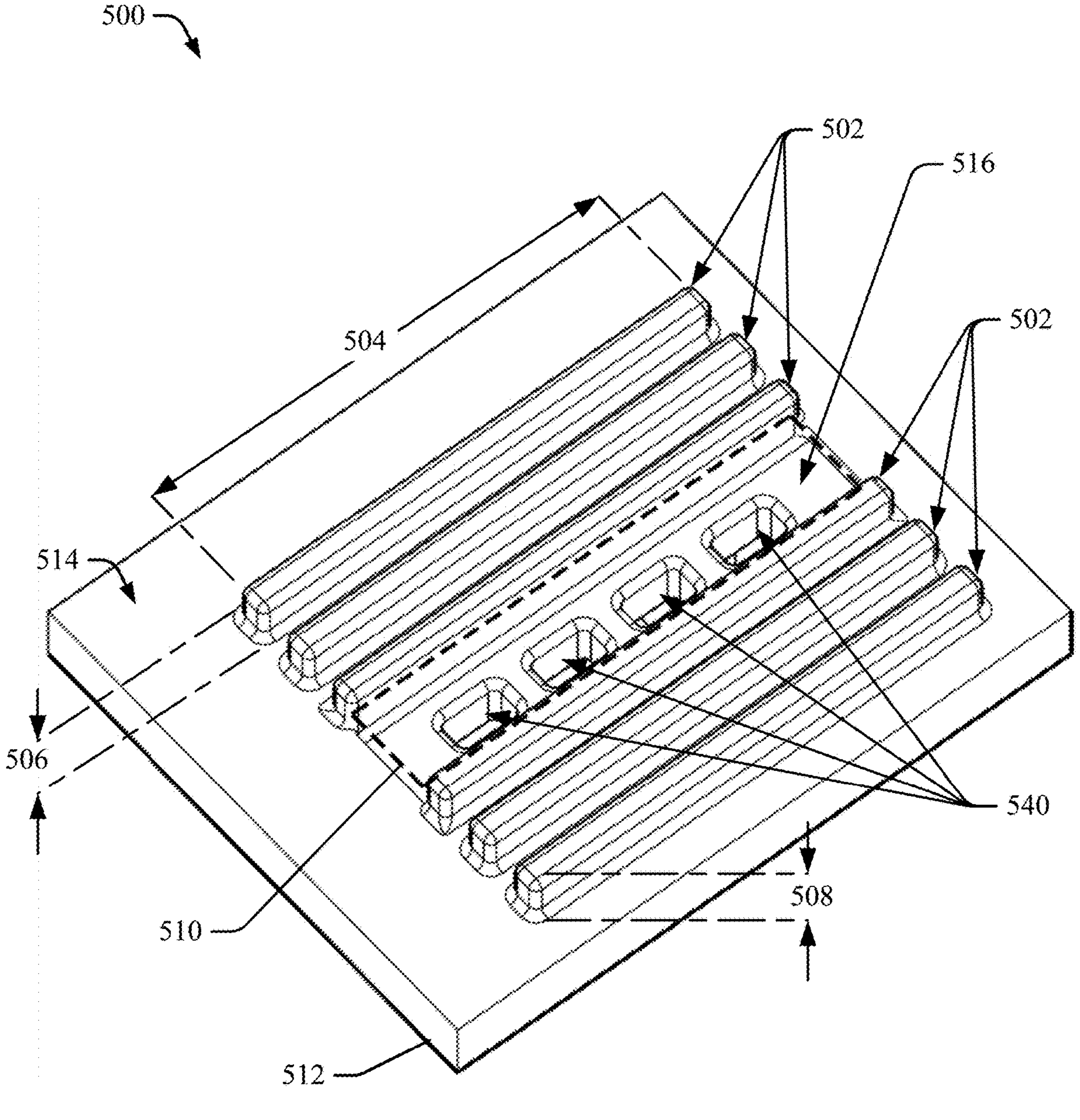
Figure 6:
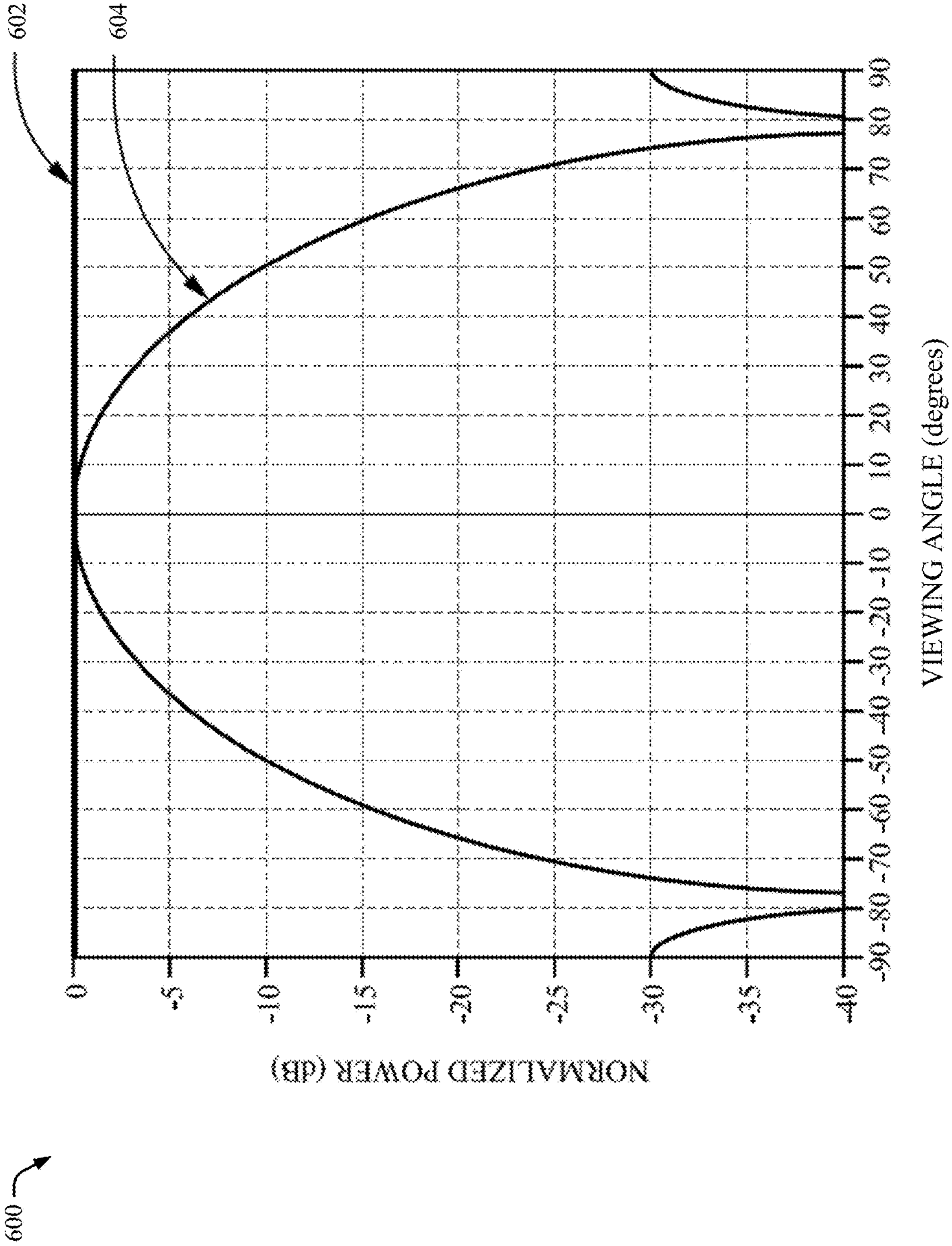

FIGS. 4-1 through 4-6 illustrate views of another example antenna system 400, or parts thereof, provided by planar surface features. FIG. 4-1 illustrates an isotropic view of the antenna system 400, FIG. 4-2 illustrates a top down view of the antenna system 400, and FIG. 4-3 illustrates a side view of the antenna system 400. FIG. 4-4 illustrates planar surface features arranged on a planar surface of a first structure the antenna system 400, and FIG. 4-5 illustrates planar surface features arranged on a planar surface of a second structure the antenna system 400. FIG. 4-6 illustrates an isotropic view of a feed network formed between the planar surfaces features of the first and second first structures. Portions of the antenna system 400 may be omitted, duplicated, or combined with the other examples described herein (e.g., the waveguide 200, the antenna system 300 or the waveguide 200-1) to form other antenna designs.

In contrast to the four-slot antenna provided with the antenna system 300, the antenna system 400 is a three-slot antenna including three radiating slots 340. The antenna system 400 may be a portion of the antenna system 110, which uses planar surface features to form a power divider for a feed network 418 formed between two structures 412-1 and 412-2. A waveguide, a power divider, a coupling tunnel, an iris, an output, and a radiating slot are some examples of antenna components or features formed between planar surface features in the system 400, in accordance with the described techniques. Some aspects of the antenna system 400 may be modified, omitted, duplicated, or combined with the other examples described herein to form other feed network designs. Some features from the antenna system 400 are similar to those described for the antenna system 110, the waveguide 200, and/or the antenna system 300. The examples provided herein may be combined or modified with any other examples like these, to achieve numerous antenna system designs, including multiple feed networks, channels, radiating slots formed between planar surface features of two structures.

The feed network 418 contains an energy path for electromagnetic energy being transmitted or received with the antenna system 400. The feed network 418 is provided through the antenna system 400 using a three-stage power divider formed between two structures 412-1 and 412-2. The feed network 418 is configured to feed electromagnetic energy to and from the radiating slots 430, from between groups of planar surface features formed on or within opposing planar surfaces 414-1 and 414-2. The feed network 418 is shaped by portions of a groove 420 within the planar surface 414-1, and portions of surface features 422 arranged about the planar surface 414-2, opposite the groove 420. The radiating slots 430 are formed in a planar surface 414-3, which is on an opposite side of the structure 412-2 from the planar surface 414-2. Although not shown, a separation gap or a gap distance g is located about a separation plane 416 adjacent to the planar surface 414-1 and 414-2. The separation plane 416 divides the feed network 418 into two parts formed on the two structures 412-1 and 412-2.

Similar to the feed network 318, the feed network 418 has multiple divider stages to feed multiple outputs 448-1, 448-2, and 448-3 (referred to collectively as the outputs 448). However, unlike the feed network 318, the output 448-2 is a combined output for at least two divider stages; two divider stages within the feed network 418 combine at the output 448-2 to feed a same radiating slot 440. The output 448-1 and the output 448-3 each feed different, corresponding radiating slots 440. The antenna system 400 is one example of combined outputs. Different quantities of the radiating slots 440 can be used with various quantities of divider stages feeding various quantities of the outputs 448. For example, the groove 420 and the arrangement of the surface features 422 can be modified to provide seven divider stages for feeding six radiating slots; two pairs of outputs (e.g., middle outputs) are combined from different pairs of divider stages to enable excitation at two different radiating slots. As another example, the groove 420 and the arrangement of the surface features 422 can be modified to provide seven divider stages for feeding seven radiating slots; the output from each divider stage excites a different radiating slot.

FIG. 5 illustrates an isometric view of additional examples of planar surface features for waveguides and antennas. Portions of an antenna system 500 are shown in FIG. 5, some of which may be omitted, duplicated, or combined with the other examples described herein (e.g., the waveguide 200, the antenna systems 300 and 400) to form other antenna designs.

The antenna system 500 includes a structure 512 including a planar surface 514 having one or more radiating slots 540. The structure 512 may be a single structure with an opposite planar surface configured to support other antenna components. The structure 512 is an example of the structures 312-2 and 412-2. However, unlike the planar surface 314-3 and 414-3 used in the antenna systems 300 and 400, additional features are included in the planar surfaces 514 to improve radiation patterns associated with the radiating slots 540.

The antenna system 500 can be added to the antenna systems 110, 300, and/or 400 by replacing a planar surface including radiating slots (e.g., the planar surface 314-3 or 414-3) with the planar surface 514 of the structure 512. The structure 512 represents a slot antenna system configure to enable a feed network (not shown) formed into the planar surface 514 (e.g., within the structure 512, between complimentary parts of the structure 512). The feed network is configured to propagate electromagnetic energy along an energy path formed beneath the planar surface 514 of the structure 512 through openings in the planar surface 514, which are provided by the radiating slots 540. The radiating slots 540 may include one or more slots and may be coupled to individual outputs or combined outputs from the feed network within the antenna system 500.

The planar surface 514 has a recessed cavity 510. The recessed cavity 510 is a planar surface feature that contours the planar surface 514 to form walls that surround a cavity floor 516. The cavity floor 516 is sunk or embedded within a portion of the planar surface 514 through which at least one of the radiating slots 540 is open through the structure 512 and to the energy path provided by the feed network under the planar surface 514.

In addition to the recessed cavity 510 through which the radiating slots 540 are formed, the planar surface 514 includes ridge features 502, as examples of other planar surface features for waveguides and antennas. Two sets of the ridge features 502 are shown to protrude from the planar surface 514, on either side of the recessed cavity 510. Any quantity of the ridge features 502 may be used. Different quantities may be used on the opposite sides of the cavity 510. The antenna system 500 may include one or more of the ridge features 502 only on one side of the cavity 510.

The recessed cavity 510 is shown to be rectangular but can be other shapes. The recessed cavity 510 may have other polygon, elliptical, or circular shapes. The ridge features 502 are formed on the planar surface 514 to be arranged along a length of the radiating slots 540.

The ridge features 502 have a ridge length 504 that is parallel with at least one of the cavity walls adjacent to either side of the cavity 510. A ridge width 506 and a ridge height 508 define other dimensions of the ridge features 502, each of which is spaced apart on the planar surface 514. The ridge length 504 is larger than a length of a wall of the recessed cavity 510 that is parallel with a length of the radiating slots 540. The ridge width 506 is approximately one eighth to one half a desired wavelength for the antenna system 500.

The ridge height 508 is approximately one quarter (e.g., greater than one quarter) the desired wavelength. The ridge height 508 is set further, however, based on the desired radiation coverage for the antenna system 500. Cross-interference often occurs when the planar surface 514 supports other antenna elements or antenna components. Because it is flat, the planar surface 514 propagates interference produced from other components on the planar surface 514, including near the radiating slots 540. The ridge height 508 can be set to a specific size to configure the ridge features 502 to increase or reduce cross-interference prevention near the cavity floor 516 in and around the radiating slots 540.

For instance, the antenna system 500 can provide a narrow coverage for the electromagnetic energy propagating along the energy path provided by the feed network under the planar surface 514 by controlling a depth and/or size of the cavity floor 516 and surrounding ridge features 502. Increased cavity depth or to the ridge height 508 may achieve a narrower coverage; the dimensions of the recessed cavity 510 or the ridge features 502 may be decreased to obtain a wider coverage, but still narrower than a radiation pattern achievable if the ridge features 502 and/or the recessed cavity 510 are not used (e.g., level with the planar surface 514).

The ridge features 502 are examples of planar surface features that can be sized and arranged in different ways to achieving a desired antenna coverage. Adjusting the ridge height 508 or other dimension of the ridge features 502 can achieve different radiation patterns. The ridge features 502 and the cavity floor 516 combine their effects to prevent interference propagating near the planar surface 514. The ridge features 502 and the cavity floor 516 combine their effects to prevent interference propagating near the planar surface 514. The antenna system 500 can provide a narrow coverage for the electromagnetic energy propagating along the energy path provided by the feed network under the planar surface 514 by controlling a depth and/or size of the cavity floor 516 and surrounding ridge features 502. Increased cavity depth or to the ridge height 508 may achieve a narrower coverage; the dimensions of the recessed cavity 510 or the ridge features 502 may be decreased to obtain a wider coverage, but still narrower than a radiation pattern achievable if the ridge features 502 and/or the recessed cavity 510 are not used (e.g., level with the planar surface 514).

In some examples, the ridge features 502 include at least two ridge features. A first group of the ridge features 502 is arranged on a first side of the recessed cavity 510 and a second group of the ridge features 502 is arranged on a second side of the recessed cavity 510. Said differently, the ridge features 502 may be distributed in evenly sized or different sized groups on either side of the recessed cavity 510. Although shown in FIG. 5 as having two groups of three, the ridge features 502 can include a single ridge on one side of the recessed cavity 510, or any number of ridges arranged on one or both sides of the recessed cavity 510. More ridges may be used on a side that is particularly.

Example Results

FIG. 6 illustrates radiation patterns obtainable using planar surface features for waveguides and antennas. For example, as described in the context of the antenna system 500, the planar surface 514, when used to support the radiating slots 540 that form holes through the structure 512 and into a feed network under the planar surface 514, may propagate interference caused from other components of the antenna system 500, which are located on or near the radiating slots 540. It may be difficult to control a radiation pattern to provide a specific coverage. As shown by a graph 600, two different normalized power functions for the antenna system 500 are shown across the entire azimuth plane in the field of view 106. A function 602 provides coverage achieved by the antenna system 500, if the ridge features 502 and the recessed cavity 510 are not used (e.g., their dimensions are set to be level with the planar surface 514). As shown, the function 602 provides the same power in azimuth direction across the entire field of view 106. In contrast, a function 604 provides a narrower coverage achieved from using the ridge features 502 and the recessed cavity 510. The coverage defined by the function 604 is focused in the azimuth direction on just a portion of the field of view. The function 604 indicates narrower coverage than the function 602 and is achieved by setting the ridge height 508 and/or dimensions of the recessed cavity 510. Controlling their dimensions enables the function 604 to be adjusted to obtain coverage for a specific azimuth window within the field of view 106.

Example Processes

Figure 7:
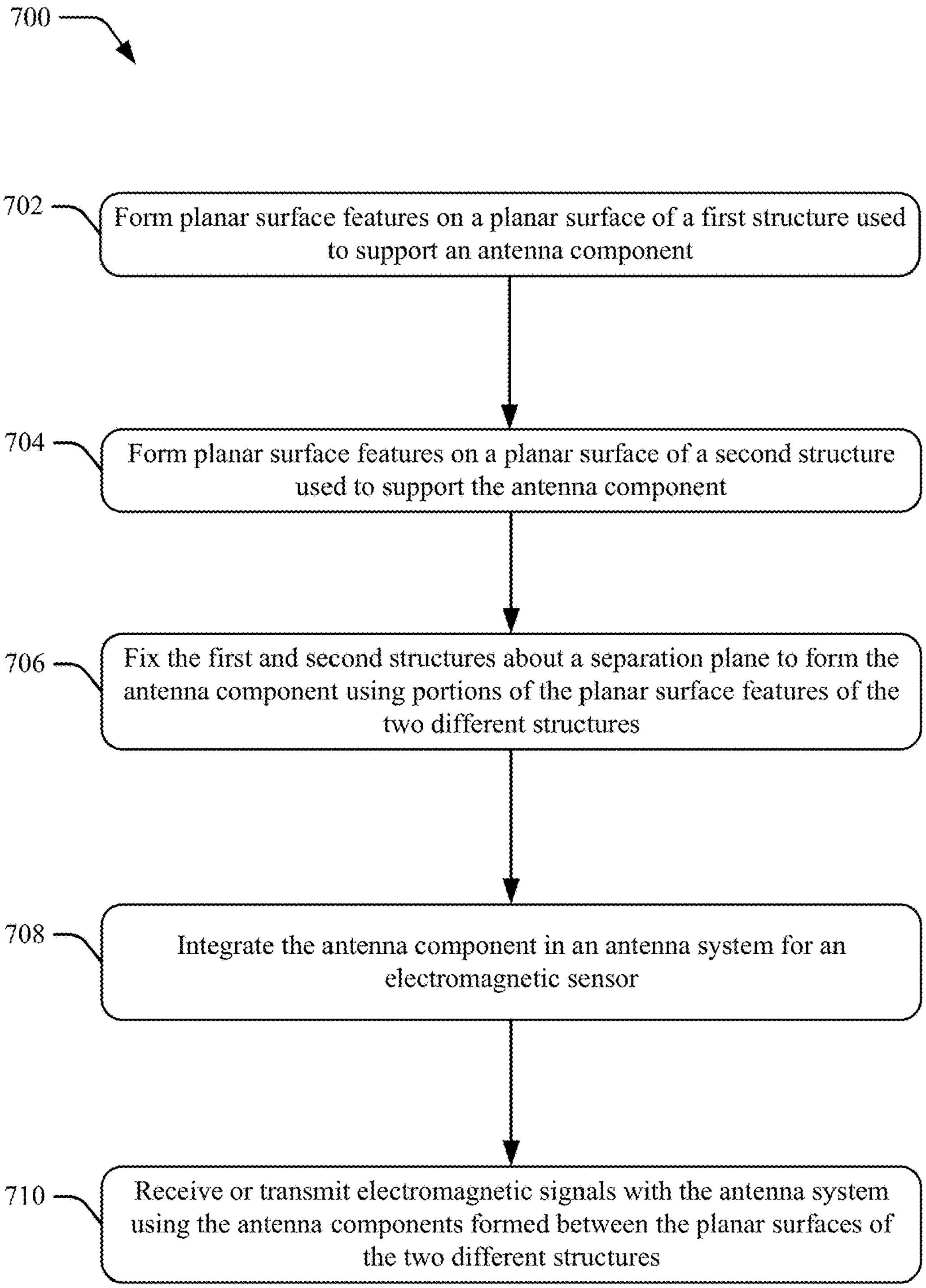
FIG. 7 illustrates an example process of forming and using waveguides and antennas from planar surface features, in accordance with techniques of this disclosure.

FIG. 7 illustrates an example process of forming and using planar surface features for waveguides and antennas, in accordance with techniques of this disclosure. A process 700 shown in FIG. 7 includes a series of steps, which are numbered as steps 702 to 710. The process 700 may include additional or fewer steps than those shown, including the steps arranged in different orders. The process 700 is described in the context of being executed by one or more computer-controlled machines configured to form and/or integrate waveguide and antennas formed with planar surface features, in accordance with the described techniques. For example, a manufacturing robot may form antenna systems from plate structures by executing instructions stored within memory that configure an embedded processor of the robot to perform the process 700 including the individual steps. Multiple processors may be used to execute the process, for instance, with one processor controlling part of the process to form the waveguides or antennas, and another different processor controlling another part of the process to integrate and/or use the waveguides or antennas in radar system (e.g., the radar system 104).

At step 702, planar surface features are formed on a planar surface of a first structure used to support an antenna component. At step 704, planar surface features are formed on a planar surface of a second structure used to support the antenna component. For example, the structures 112-1, 212-1, 312-1, 412-1, and/or 512 can be formed using injection molding, casting, three dimensional printing, machining, or other techniques to fabricate a groove and/or radiating slots in opposing planar surfaces of a first plate. A second plate can be shaped using similar techniques as the first plate, to form the structures 112-2, 212-2, 312-2, and/or 412-2. In cases where the structure 512 is formed to be a single piece, steps 702 and 704 are combined and the process skips to step 708.

At step 706, the first and second structures are fixed about a separation plane to form the antenna component using portions of the planar surface features of the two different structures. For example, the structures 112-1 and 112-2 are arranged about a separation gap (e.g., a gap distance g) between the surface features 122 and the groove 120. Adhesives, bonding materials, fixtures, or other joint materials and/or parts may be used to retain the two structure 112-1 and 112-2 in alignment about the separation plane 116. The structures 212-1 and 212-2, 312-1 and 312-2, and 412-1 and 412-2 may be formed using similar techniques. The steps 702 to 706 can be combined into a single step in examples where the structure 512 is formed from one piece of material.

At step 708, the antenna component is integrated in an antenna system for an electromagnetic sensor. For example, the antenna system 110 for the radar system 104 may be integrated in the vehicle 102. The antenna system 110 can be integrated into various planar surfaces on different parts of the vehicle 102. The structures that support these planar surfaces can define two-piece channels or feed networks formed on or between these planar surface features to propagate electromagnetic energy between the environment 100 and the radar system 104. The antenna system 110 is formed by pairing two complementary parts, which individual can be formed using less complex processes or equipment than if an equivalent antenna system is formed from a single structure. In some cases, the antenna system 110 includes a mixture of different antenna components formed in similar or different ways and integrated on the vehicle 102. In some cases, the antenna system 110, 300, 400, 500 can be combined into a single system using various planar surface features that provide channels and feed networks for a specific use case. For example, a single first planar structure can support a combination of the grooves 220, 320, and/or 420 formed in that planar surface, and a single second planar structure can support complimentary arrangements of the surface features 222, 322, and/or 422 to form the channel 218, the feed network 318, and/or the feed network 418 between the two structures.

At step 710, electromagnetic signals are transmitted or received with the antenna system using the antenna components formed between the planar surfaces of the two different structures. For example, the radar system 104 may be configured to transmit or receive radar signals that propagate as electromagnetic energy through the channels 118, the channel 218, the feed network 318, and/or the feed network 418. The antenna system 500 can achieve narrow coverage using the planar surface features formed on the single structure 512. The planar surface 514 of the structure 512 can be combined with the antenna systems 300 and 400 to achieve narrow coverage with the radiating slots 340 and 440 formed on the planar surfaces 314-3 and 414-3.

Additional Examples

In the following section, some additional examples are provided.

Example 1: A waveguide comprising: a first structure with a first planar surface arranged adjacent to a separation plane dividing a channel for an energy path to propagate electromagnetic energy through the waveguide, a recessed groove being shaped into the first planar surface to form a first part of the channel between side walls of the groove; and a second structure with a second planar surface arranged adjacent to the separation plane and opposite the first planar surface, an arrangement of surface feature formed on the second planar surface being spaced and shaped to form a second part of the channel to compliment the first part formed by the recessed groove, at least two adjacent surface features comprising adjacent protrusions in the arrangement aligned with opposing side walls of the recessed groove to bound an area of the second planar surface located on and between the adjacent protrusions as the second part of the channel, a portion of the second planar surface at each of the adjacent protrusions being contoured to a different opposing side wall of the recessed groove to configure the energy path through the channel and configure the channel to prevent energy leakage from the separation plane dividing the channel.

Example 2: The waveguide of any proceeding example, wherein a rectangular input to the channel is provided at one end of the groove.

Example 3: The waveguide of any previous example, wherein a gap distance is maintained about the separation plane between the first planar surface and the arrangement of surface feature to configure the channel to propagate the electromagnetic energy and prevent the leakage near the separation plane.

Example 4: The waveguide of any previous example, wherein a spacing of the surface features in the arrangement is set based on a width of the groove, and a height of the surface features in the arrangement is set based on a depth of the groove.

Example 5: The waveguide of any previous example, wherein the channel comprises a channel width and a channel height set based on a desired electromagnetic energy wavelength for the waveguide, the channel width being defined by the width of the groove or the spacing of the surface features, and the channel height being defined by the gap distance, the height of the surface features, and the depth of the groove.

Example 6: The waveguide of any previous example, wherein the arrangement comprises a periodic pattern formed by a group of the surface features that are distributed evenly on the second planar surface.

Example 7: The waveguide of any previous example, wherein the arrangement comprises a grid arrangement of the surface features positioned in one or more rows and columns.

Example 8: The waveguide of any previous example, wherein the surface features are each a same shape and size.

Example 9: The waveguide of any previous example, wherein at least two of the surface features are a different shape and size.

Example 10: The waveguide of any previous example, wherein the first structure comprises a first plate with another planar surface opposite the first planar surface, and the second structures comprise a second plate with a fourth planar surface opposite the second planar surface.

Example 11: An antenna system including: a first structure with a first planar surface arranged adjacent to a separation plane dividing a feed network for an energy path to propagate electromagnetic energy through the antenna system, a recessed groove being shaped into the first planar surface to form a first part of the feed network between side walls of the groove; and a second structure with a second planar surface arranged adjacent to the separation plane, opposite the first planar surface, and opposite a third planar surface of the second structure, an arrangement of surface features formed on the second planar surface being spaced and shaped to form a second part of the feed network to compliment the first part formed by the recessed groove, the third planar surface providing at least one radiating slot through the second structure and into the second part of the feed network, at least two surface features in the arrangement comprising adjacent protrusions aligned with opposing side walls of the recessed groove to bound an area of the second planar surface located on and between the adjacent protrusions to form the second part of the feed network, a portion of the second planar surface at each of the adjacent protrusions being contoured to a different opposing side wall of the recessed groove to configure the energy path through the feed network and configure the feed network to prevent energy leakage from the separation plane dividing the feed network.

Example 12: The antenna system of any previous example, wherein the antenna system comprise at least one of aperture antennas, microstrip antennas, microstrip patch antennas, dipole antennas, substrate-integrated waveguide (SIW) antennas, slot array antennas, waveguide end-array antennas, or horn antennas.

Example 13: The antenna system of any previous example, wherein the system further comprises: an interface to a device configured to transmit or receive electromagnetic signals via the feed network through the antenna system.

Example 14: The antenna system of any previous example, wherein the device comprises a radar device for a vehicle.

Example 15: The antenna system of any previous example, wherein the arrangement comprises a group of the surface features distributed unevenly on the second planar surface.

Example 16: The antenna system of any previous example, wherein the arrangement comprises a grid arrangement of the surface features positioned in one or more rows and columns.

Example 17: The antenna system of any previous example, wherein at least two of the surface features are a different shape and size; and wherein at least two of the surface features sized and shaped to prevent energy leakage from tunnels of the feed network that change dimension or direction of the feed network relative the radiating slot.

Example 18: The antenna system of any previous example, wherein the feed network comprises a divider stage, and the at least one radiating slot through the second structure comprises a single slot formed into a corresponding output of the divider stage.

Example 19: The antenna system of any previous example, wherein the feed network comprises a divider stage with a pair of outputs separated by an iris in the divider stage, and the at least one radiating slot through the second structure comprises a slot formed into each output from the pair of outputs.

Example 20: The antenna system of any previous example, wherein the feed network comprises multiple divider stages, and the at least one radiating slot through the second structure comprises a single slot formed into a combined output of the multiple divider stages.

Example 21: An antenna system comprising: a structure configured to provide a feed network for propagating electromagnetic energy along an energy path formed under a planar surface of the structure, the planar surface including: a recessed cavity having walls that surround a cavity floor embedded within a portion of the planar surface, the cavity floor shaped to form at least one radiating slot open through the structure and to the energy path provided by the feed network under the planar surface; one or more ridge features that each protrude from the planar surface on either side of the recessed cavity, at least one ridge feature including at a ridge length that is parallel with at least one of the cavity walls, and a ridge height set to configure that ridge feature to prevent cross-interference near the radiating slot within the cavity floor thereby narrowing coverage for the electromagnetic energy within the feed network.

Example 22: The antenna system of any previous example, wherein the antenna system comprise at least one of aperture antennas, microstrip antennas, microstrip patch antennas, dipole antennas, substrate-integrated waveguide (SIW) antennas, slot array antennas, waveguide end-array antennas, or horn antennas.

Example 23: The antenna system of any previous example, wherein the system further comprises: an interface to a device configured to transmit or receive electromagnetic signals via the feed network through the antenna system.

Example 24: The antenna system of any previous example, wherein the device comprises a radar device for a vehicle.

Example 25: The antenna system of any previous example, wherein the one or more ridge features are distributed in different groups on either side of the recessed cavity.

Example 26: The antenna system of any previous example, wherein the one or more ridge features comprise at least two ridge features including a first group of the ridge features is arranged on a first side of the recessed cavity and a second group of the ridge features is arranged on a second side of the recessed cavity.

Example 27: The antenna system of any previous example, wherein the one or more ridge features are distributed evenly between the first group and the second group.

Example 28: The antenna system of any previous example, wherein the one or more ridge features are distributed unevenly between the first group and the second group.

Example 29: The antenna system of any previous example, wherein the one or more ridge features comprise a single ridge feature.

Example 30: The antenna system of any previous example, wherein the feed network comprises a divider stage, and the at least one radiating slot through comprises a single slot formed into a corresponding output of the divider stage.

Example 31: The antenna system of any previous example, wherein the feed network comprises a divider stage with a pair of outputs separated by an iris in the divider stage.

Example 32: The antenna system of any previous example, wherein the at least one radiating slot through the comprises a slot formed into each output from the pair of outputs.

Example 33: The antenna system of any previous example, wherein the feed network comprises multiple divider stages, and the at least one radiating slot comprises a single slot formed into a combined output of the multiple divider stages.

Example 34: The antenna system of any previous example, wherein the structure comprises a first structure and the planar surface comprises a third planar surface opposite the first structure from a first planar surface, the system further comprising: a second structure with a second planar surface arranged adjacent to a separation plane dividing the feed network between the first planar surface and the second planar surface, and opposite a third planar surface of the second structure; the first planar surface including an arrangement of surface features spaced and shaped to form a first part of the feed network between at least two surface features in the arrangement, the third planar surface providing the at least one radiating slot into the first part of the feed network; the second planar surface including a recessed groove shaped to form a second part of the feed network between side walls of the groove to compliment the first part formed by the surface features, the at least two surface features comprising adjacent protrusions aligned with opposing side walls of the recessed groove to bound an area of the first planar surface located on and between the adjacent protrusions to form the first part of the feed network, a portion of the first planar surface at each of the adjacent protrusions being contoured to a different opposing side wall of the recessed groove to configure the energy path through the feed network and configure the feed network to prevent energy leakage from the separation plane dividing the feed network.

Example 35: The antenna system of any previous example, wherein at least two of the surface features are a different shape and size.

Example 36: The antenna system of any previous example, wherein at least two of the surface features sized and shaped to prevent energy leakage from tunnels of the feed network that change dimension or direction of the feed network relative the radiating slot.

Example 37: The antenna system of any previous example, wherein a rectangular input to the feed network is provided at one end of the groove.

Example 38: The antenna system of any previous example, wherein a gap distance is maintained about the separation plane between the second planar surface and the arrangement of surface features to configure the feed network to propagate the electromagnetic energy and prevent the leakage near the separation plane.

Example 39: The antenna system of any previous example, wherein: a spacing of the surface features is set based on a groove width, and a height of the surface features in the arrangement is set based on a groove depth; and the feed network comprises a channel width and a channel height set based on a desired electromagnetic energy wavelength for the antenna system, the channel width being defined by the groove width or the spacing of the surface features, and the channel height being defined by the gap distance, the height of the surface features, and the groove depth.

Example 40: The antenna system of any previous example, wherein the structure comprises a first plate with another planar surface opposite the planar surface and aligned about a separation plane with a planar surface of a second plate to complete the feed network under the planar surface and between the first plate and the second plate.

Example 41: A method comprising forming the waveguide or the antenna system of any preceding example.

Example 42: A method comprising using the waveguide or the antenna system of any preceding example to transmit or receive electromagnetic signals.

Example 43: A system comprising a device configured to perform the method of any previous example using the waveguide or the antenna system of any preceding example.

Example 44: A system comprising at least one processor configured to perform the method of any previous example using the waveguide or the antenna system of any preceding example.

Example 45: A system comprising means for the method of any previous example using the waveguide or the antenna system of any preceding example.

Example 46: A computer-readable storage media comprising instructions that, when executed, configure at least one processor to execute the method of any previous example using the waveguide or the antenna system of any preceding example.

Example 47: The system of any preceding example, wherein the system comprises a radar system.

Example 48: The system of any preceding example, wherein the system is a vehicle.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A waveguide comprising:

a first structure with a first planar surface arranged adjacent to a separation plane dividing a channel for an energy path to propagate electromagnetic energy through the waveguide, a recessed groove being shaped into the first planar surface to form a first part of the channel between side walls of the groove, wherein the groove does not extent entirely through the first structure; and a second structure with a second planar surface arranged adjacent to the separation plane and opposite the first planar surface, an arrangement of surface features formed on the second planar surface being spaced and shaped to form a second part of the channel to compliment the first part formed by the recessed groove, at least two adjacent surface features comprising adjacent protrusions in the arrangement aligned with opposing side walls of the recessed groove to bound an area of the second planar surface located on and between the adjacent protrusions as the second part of the channel, a portion of the second planar surface at each of the adjacent protrusions being contoured to a different opposing side wall of the recessed groove to configure the energy path through the channel and configure the channel to prevent energy leakage from the separation plane dividing the channel.

2. The waveguide of claim 1,
wherein a rectangular input to the channel is provided at one end of the groove.

3. The waveguide of claim 1,
wherein a gap distance is maintained about the separation plane between the first planar surface and the arrangement of surface features to configure the channel to propagate the electromagnetic energy and prevent the leakage near the separation plane.

4. The waveguide of claim 3,
wherein a spacing of the surface features in the arrangement is set based on a width of the groove, and a height of the surface features in the arrangement is set based on a depth of the groove.

5. The waveguide of claim 4,
wherein the channel comprises a channel width and a channel height set based on a desired electromagnetic energy wavelength for the waveguide, the channel width being defined by the width of the groove or the spacing of the surface features, and the channel height being defined by the gap distance, the height of the surface features, and the depth of the groove.

6. The waveguide of claim 1,
wherein the arrangement comprises a periodic pattern formed by a group of the surface features that are distributed evenly on the second planar surface.

7. The waveguide of claim 1,
wherein the arrangement comprises a grid arrangement of the surface features positioned in one or more rows and columns.

8. The waveguide of claim 1,
wherein the surface features are each a same shape and size.

9. The waveguide of claim 1,
wherein at least two of the surface features are a different shape and size.

10. The waveguide of claim 1, wherein the first structure comprises a first plate with another planar surface opposite the first planar surface, and the second structures comprises a second plate with a fourth planar surface opposite the second planar surface.

11. An antenna system including:
a first structure with a first planar surface arranged adjacent to a separation plane dividing a feed network for an energy path to propagate electromagnetic energy through the antenna system, a recessed groove being shaped into the first planar surface to form a first part of the feed network between side walls of the groove; and
a second structure with a second planar surface arranged adjacent to the separation plane, opposite the first planar surface, and opposite a third planar surface of the second structure, an arrangement of surface features formed on the second planar surface being spaced and shaped to form a second part of the feed network to compliment the first part formed by the recessed groove, the third planar surface providing at least one radiating slot through the second structure and into the second part of the feed network,
at least two surface features in the arrangement comprising adjacent protrusions aligned with opposing side walls of the recessed groove to bound an area of the second planar surface located on and between the adjacent protrusions to form the second part of the feed network, a portion of the second planar surface at each of the adjacent protrusions being contoured to a different opposing side wall of the recessed groove to configure the energy path through the feed network and configure the feed network to prevent energy leakage from the separation plane dividing the feed network,
wherein the feed network comprises a divider stage, and the at least one radiating slot through the second structure comprises a single slot formed into a corresponding output of the divider stage.

12. The antenna system of claim 11, wherein the antenna system comprise at least one of aperture antennas, microstrip antennas, microstrip patch antennas, dipole antennas, substrate-integrated waveguide (SIW) antennas, slot array antennas, waveguide end-array antennas, or horn antennas.

13. The antenna system of claim 11, wherein the system further comprises:
an interface to a device configured to transmit or receive electromagnetic signals via the feed network through the antenna system.

14. The antenna system of claim 13, wherein the device comprises a radar device for a vehicle.

15. The antenna system of claim 11,
wherein the arrangement comprises a group of the surface features distributed unevenly on the second planar surface.

16. The antenna system of claim 11,
wherein the arrangement comprises a grid arrangement of the surface features positioned in one or more rows and columns.

17. The antenna system of claim 11,
wherein at least two of the surface features are a different shape and size; and
wherein at least two of the surface features are sized and shaped to prevent energy leakage from tunnels of the feed network that change dimension or direction of the feed network relative to the radiating slot.

18. An antenna system including:
a first structure with a first planar surface arranged adjacent to a separation plane dividing a feed network for an energy path to propagate electromagnetic energy through the antenna system, a recessed groove being shaped into the first planar surface to form a first part of the feed network between side walls of the groove; and
a second structure with a second planar surface arranged adjacent to the separation plane, opposite the first planar surface, and opposite a third planar surface of the second structure, an arrangement of surface features formed on the second planar surface being spaced and shaped to form a second part of the feed network to compliment the first part formed by the recessed groove, the third planar surface providing at least one radiating slot through the second structure and into the second part of the feed network,
at least two surface features in the arrangement comprising adjacent protrusions aligned with opposing side walls of the recessed groove to bound an area of the second planar surface located on and between the adjacent protrusions to form the second part of the feed network, a portion of the second planar surface at each of the adjacent protrusions being contoured to a different opposing side wall of the recessed groove to configure the energy path through the feed network and configure the feed network to prevent energy leakage from the separation plane dividing the feed network, wherein the feed network comprises a divider stage with a pair of outputs separated by an iris in the divider stage, and the at least one radiating slot through the second structure comprises a slot formed into each output from the pair of outputs.

19. An antenna system including:

a first structure with a first planar surface arranged adjacent to a separation plane dividing a feed network for an energy path to propagate electromagnetic energy through the antenna system, a recessed groove being shaped into the first planar surface to form a first part of the feed network between side walls of the groove; and a second structure with a second planar surface arranged adjacent to the separation plane, opposite the first planar surface, and opposite a third planar surface of the second structure, an arrangement of surface features formed on the second planar surface being spaced and shaped to form a second part of the feed network to compliment the first part formed by the recessed groove, the third planar surface providing at least one radiating slot through the second structure and into the second part of the feed network, at least two surface features in the arrangement comprising adjacent protrusions aligned with opposing side walls of the recessed groove to bound an area of the second planar surface located on and between the adjacent protrusions to form the second part of the feed network, a portion of the second planar surface at each of the adjacent protrusions being contoured to a different opposing side wall of the recessed groove to configure the energy path through the feed network and configure the feed network to prevent energy leakage from the separation plane dividing the feed network, wherein the feed network comprises multiple divider stages, and the at least one radiating slot through the second structure comprises a single slot formed into a combined output of the multiple divider stages.

* * * * *